(12) United States Patent
Kunii et al.

(10) Patent No.: US 10,968,358 B2
(45) Date of Patent: Apr. 6, 2021

(54) AQUEOUS PIGMENT DISPERSION

(71) Applicant: KAO CORPORATION, Tokyo (JP)

(72) Inventors: Satoshi Kunii, Wakayama (JP); Teruyuki Fukuda, Wakayama (JP); Satoshi Tanaka, Wakayama (JP); Yuki Suzuki, Wakayama (JP)

(73) Assignee: KAO CORPORATION, Tokyo (JP)

(*) Notice: Subject to any disclaimer, the term of this patent is extended or adjusted under 35 U.S.C. 154(b) by 257 days.

(21) Appl. No.: 16/065,281

(22) PCT Filed: Dec. 22, 2016

(86) PCT No.: PCT/JP2016/088331
§ 371 (c)(1),
(2) Date: Jun. 22, 2018

(87) PCT Pub. No.: WO2017/110997
PCT Pub. Date: Jun. 29, 2017

(65) Prior Publication Data
US 2019/0300730 A1    Oct. 3, 2019

(30) Foreign Application Priority Data
Dec. 25, 2015 (JP) .............................. JP2015-254391

(51) Int. Cl.
| | | |
|---|---|---|
| C09D 11/322 | (2014.01) | |
| C08F 212/08 | (2006.01) | |
| C08F 220/06 | (2006.01) | |
| C08F 220/18 | (2006.01) | |
| C08F 265/06 | (2006.01) | |
| C08G 59/22 | (2006.01) | |
| C08L 63/00 | (2006.01) | |
| C09D 11/102 | (2014.01) | |
| C09D 125/14 | (2006.01) | |
| C09B 67/20 | (2006.01) | |
| C08G 59/24 | (2006.01) | |
| C09D 11/107 | (2014.01) | |
| C09D 163/00 | (2006.01) | |
| C09B 67/46 | (2006.01) | |
| C09D 133/06 | (2006.01) | |
| C09D 11/326 | (2014.01) | |

(52) U.S. Cl.
CPC .......... *C09D 11/322* (2013.01); *C08F 212/08* (2013.01); *C08F 220/06* (2013.01); *C08F 220/18* (2013.01); *C08F 265/06* (2013.01); *C08G 59/22* (2013.01); *C08G 59/24* (2013.01); *C08L 63/00* (2013.01); *C09B 67/009* (2013.01); *C09B 67/0066* (2013.01); *C09B 67/0067* (2013.01); *C09D 11/102* (2013.01); *C09D 11/107* (2013.01); *C09D 125/14* (2013.01); *C09D 133/064* (2013.01); *C09D 163/00* (2013.01); *C08L 2201/54* (2013.01); *C09D 11/326* (2013.01)

(58) Field of Classification Search
CPC ...... C08L 63/00; C08F 220/30; C08F 212/08; C08F 220/06; C09D 17/00; C09D 11/322; C08J 3/24; C08G 59/22
USPC .................................................. 523/160, 161
See application file for complete search history.

(56) References Cited

U.S. PATENT DOCUMENTS

| | | | |
|---|---|---|---|
| 5,039,343 A | 8/1991 | Umeda et al. | |
| 8,871,859 B2 | 10/2014 | Li et al. | |
| 2008/0002004 A1 | 1/2008 | O'Donnell et al. | |
| 2008/0064786 A1* | 3/2008 | Tanaka ................. | C09D 11/322 523/201 |
| 2009/0036570 A1 | 2/2009 | Anderson | |
| 2009/0220693 A1 | 9/2009 | Takemura et al. | |
| 2010/0112318 A1* | 5/2010 | McIntyre ................ | B01J 13/14 428/206 |
| 2010/0298483 A1 | 11/2010 | Allen et al. | |

(Continued)

FOREIGN PATENT DOCUMENTS

| | | |
|---|---|---|
| EP | 3498792 A1 | 6/2019 |
| JP | 3-47875 A | 2/1991 |
| JP | 2005-48016 A | 2/2005 |
| JP | 2005-105111 A | 4/2005 |
| JP | 2007-193312 A | 8/2007 |
| JP | 2007-204595 A | 8/2007 |
| JP | 2007-314784 A | 12/2007 |
| JP | 2008-524369 A | 7/2008 |
| JP | 2010-535280 A | 11/2010 |
| JP | 2011-137055 A | 7/2011 |

(Continued)

OTHER PUBLICATIONS

Nagase America, Denacol EX-L series, 2010 (Year: 2010).*

(Continued)

*Primary Examiner* — Doris L Lee
(74) *Attorney, Agent, or Firm* — Birch, Stewart, Kolasch & Birch, LLP

(57) ABSTRACT

The present invention relates to [1] a pigment water dispersion containing pigment-containing crosslinked polymer particles, in which a crosslinked polymer in the particles is a polymer that is crosslinked with a crosslinking agent represented by the general formula (1), and [2] a process for producing a pigment water dispersion containing pigment-containing crosslinked polymer particles, including the following steps (1) and (2): Step (1): subjecting a pigment mixture containing a pigment, a water-dispersible polymer and water to dispersion treatment, thereby obtaining an aqueous pigment dispersion solution containing pigment-containing polymer particles; and Step (2): mixing the aqueous pigment dispersion solution obtained in the step (1) and a crosslinking agent represented by the general formula (1) to react the water-dispersible polymer with the crosslinking agent, thereby obtaining a pigment water dispersion containing pigment-containing crosslinked polymer particles.

16 Claims, No Drawings

(56) References Cited

U.S. PATENT DOCUMENTS

| | | | |
|---|---|---|---|
| 2011/0249055 A1* | 10/2011 | Sasada | C09D 11/40 347/20 |
| 2012/0301621 A1 | 11/2012 | Dombrowski et al. | |
| 2015/0291817 A1 | 10/2015 | Katoh et al. | |
| 2016/0251528 A1 | 9/2016 | Mizutani et al. | |

FOREIGN PATENT DOCUMENTS

| | | |
|---|---|---|
| JP | 2012-180516 A | 9/2012 |
| JP | 2013-511605 A | 4/2013 |
| JP | 2013-522839 A | 6/2013 |
| JP | 2014-40508 A | 3/2014 |
| JP | 2014-65914 A | 4/2014 |
| JP | 2015-137344 A | 7/2015 |
| JP | 2015-205947 A | 11/2015 |
| JP | 2015-214674 A | 12/2015 |
| WO | WO 2012/035827 A1 | 3/2012 |

OTHER PUBLICATIONS

Extended European Search Report, dated Jul. 22, 2019, for European Application No. 16878884.2.
International Search Report, issued in PCT/JP2016/088331, dated Mar. 14, 2017.

* cited by examiner

AQUEOUS PIGMENT DISPERSION

FIELD OF THE INVENTION

The present invention relates to a pigment water dispersion containing pigment-containing polymer particles, and a process for producing the pigment water dispersion.

BACKGROUND OF THE INVENTION

In ink-jet printing methods, droplets of ink are directly projected onto a printing medium from very fine nozzles and allowed to adhere to the printing medium to obtain printed materials on which characters or images are printed. The ink-jet printing methods have become rapidly spread because of various advantages such as easiness of full coloration, low cost, capability of using a plain paper as the printing medium, non-contact with printed characters or images, etc.

In recent years, in order to impart good weathering resistance and water resistance to the printed materials, an ink that contains a pigment as a colorant has been extensively used in the ink-jet printing methods. In consequence, it has been attempted to improve storage stability, etc., of the ink by crosslinking a polymer as a dispersant for the pigment.

For example, JP 2013-511605A (Patent Literature 1) aims at providing a water-based ink having excellent stability, etc., and discloses an aqueous dispersion containing solid particles and a vinyl polymeric dispersant, wherein the vinyl polymeric dispersant contains a hydrophilic segment and a hydrophobic segment, the hydrophilic segment contains at least one crosslinkable moiety, and the crosslinkable moiety is crosslinked with a crosslinking agent that is substantially insoluble in an aqueous ink vehicle.

JP 2008-524369A (Patent Literature 2) aims at providing a finely dispersed stable encapsulated particulate solid, and discloses a process for preparing an encapsulated particulate solid by crosslinking a dispersant with a crosslinking agent in the presence of a particulate solid and a liquid medium to thereby encapsulate the particulate solid with the crosslinked dispersant, in which the dispersant contains a carboxylic acid group and has an acid value of at least 125 mgKOH/g, and the crosslinking agent contains at least two epoxy groups and one or more oligomeric dispersing groups.

JP 2007-314784A (Patent Literature 3) aims at providing a water-based ink that is excellent in storage stability, etc., and discloses a water dispersion for ink-jet printing which contains colorant-containing water-insoluble crosslinked polymer particles and a water-insoluble organic compound, in which the water-insoluble crosslinked polymer is a polymer obtained by crosslinking a water-insoluble polymer with a crosslinking agent.

In addition, JP 2011-137055A (Patent Literature 4) aims at improving water repellency of a print head, and discloses a process for producing a water dispersion for ink-jet printing which includes the step of adding an epoxy crosslinking agent to a water dispersion containing pigment-containing polymer particles either continuously or two or more times, in which the pigment-containing polymer particles are polymer particles formed by incorporating a pigment into a carboxy group-containing polymer, and the epoxy crosslinking agent has a solubility in water of not more than 30% and is added in an amount of 10 to 90 mol % (in terms of an epoxy group) on the basis of the carboxy group.

SUMMARY OF THE INVENTION

The present invention relates to a pigment water dispersion containing pigment-containing crosslinked polymer particles, in which a crosslinked polymer in the particles is a polymer that is crosslinked with a crosslinking agent represented by the following general formula (1):

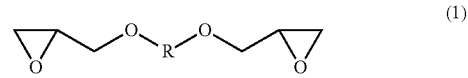

wherein R is an aliphatic hydrocarbon group having not less than 6 and not more than 14 carbon atoms.

DETAILED DESCRIPTION OF THE INVENTION

In pigment inks for ink-jet printing, the pigment is highly dispersed in the form of particles having a particle size on the order of from several tens to several hundreds of nanometers (hereinafter also referred to merely as "colloid") in a vehicle by using a dispersant. However, in recent years, with the remarkable increase in printing speed, the inks tend to be exposed to large mechanical or thermal stress. As a result, at the present time, in order to ensure good ejection stability of the inks for ejecting the inks in a continuous and stable manner (hereinafter also referred to merely as "continuous ejection stability"), there is an increasing demand for a pigment water dispersion having a high colloid stability. In addition, in order to ensure high printing quality of the inks when printed on a low-liquid absorbing printing medium such as an off-set coated paper, there is also an increasing demand for a pigment water dispersion having a high solvent resistance which can be stably maintained even in an aqueous vehicle containing a relatively large amount of a solvent.

On the other hand, in the technologies described in Patent Literatures 1 to 3, although the effect of improving storage stability of inks is recognized to some extent, it has been still required to further improve continuous ejection stability of the inks when used in high-speed printing in which high colloid stability of the inks is needed. In addition, in the technologies described in Patent Literatures 1 to 3, since the polymer is insufficiently adsorbed onto the surface of the pigment, destruction of colloids in the inks tends to be induced by the polymer dispersed in the pigment water dispersion, i.e., the so-called unadsorbed polymer, and therefore the inks tend to be insufficient in colloid stability when used in high-speed printing. Further, in the technologies described in Patent Literatures 1 to 3, it is also required to improve solvent resistance of the resulting inks.

In Patent Literature 4, it is described that the amount of an unadsorbed polymer present in the dispersion is reduced by using a hydrophobic crosslinking agent. However, the crosslinking agents described in Examples of Patent Literature 4 failed to sufficiently improve continuous ejection stability of the resulting ink when used in high-speed printing.

The present invention relates to a pigment water dispersion that is excellent in continuous ejection stability, storage stability and solvent resistance when compounded in an ink, and a process for producing the pigment water dispersion.

The present inventors have found that when a pigment water dispersion that contains pigment-containing crosslinked polymer particles in which a crosslinked polymer contained in the particles is produced by crosslinking a polymer with a specific crosslinking agent is compounded in an ink, the resulting ink is excellent in continuous ejection stability, storage stability and solvent resistance.

That is, the present invention relates to the following aspects [1] and [2].

[1] A pigment water dispersion containing pigment-containing crosslinked polymer particles, in which a crosslinked polymer in the particles is a polymer that is crosslinked with a crosslinking agent represented by the following general formula (1):

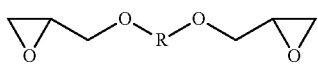

(1)

wherein R is an aliphatic hydrocarbon group having not less than 6 and not more than 14 carbon atoms.

[2] A process for producing a pigment water dispersion containing pigment-containing crosslinked polymer particles, including the following steps (1) and (2):

Step (1): subjecting a pigment mixture containing a pigment, a water-dispersible polymer and water to dispersion treatment, thereby obtaining an aqueous pigment dispersion solution containing pigment-containing polymer particles; and Step (2): mixing the aqueous pigment dispersion solution obtained in the step (1) and a crosslinking agent represented by the aforementioned formula (1) to react the water-dispersible polymer with the crosslinking agent, thereby obtaining a pigment water dispersion containing pigment-containing crosslinked polymer particles.

In accordance with the present invention, it is possible to provide a pigment water dispersion that is excellent in continuous ejection stability, storage stability and solvent resistance when compounded in an ink, and a process for producing the pigment water dispersion.

[Pigment Water Dispersion]

The pigment water dispersion of the present invention is in the form of a pigment water dispersion that contains crosslinked polymer particles containing a pigment (hereinafter also referred to merely as a "pigment water dispersion") in which a crosslinked polymer contained in the particles is a polymer that is crosslinked with a crosslinking agent represented by the following general formula (1):

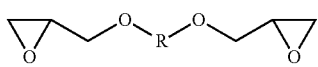

(1)

wherein R is an aliphatic hydrocarbon group having not less than 6 and not more than 14 carbon atoms.

The "crosslinked polymer particles containing a pigment" as used in the present invention (hereinafter also referred to merely as "pigment-containing crosslinked polymer particles") mean particles (after being crosslinked) obtained by adsorbing a water-dispersible polymer onto the surface of the pigment and reacting the water-dispersible polymer with the crosslinking agent, and the "polymer particles containing a pigment" as used in the present invention (hereinafter also referred to merely as "pigment-containing polymer particles") mean particles (before being crosslinked) obtained by adsorbing the water-dispersible polymer onto the surface of the pigment. In addition, the "unadsorbed polymer" as used in the present invention means the water-dispersible polymer that is not adsorbed onto the pigment in the pigment water dispersion or water-based ink.

Furthermore, the "polymer that is crosslinked with a crosslinking agent represented by the general formula (1)" as used in the present invention means a polymer having a crosslinked structure derived from the crosslinking agent represented by the aforementioned general formula (1) (hereinafter also referred to merely as a "crosslinked polymer").

The water-based ink using the pigment water dispersion of the present invention is excellent in storage stability and solvent resistance, and is capable of producing good printed materials. Therefore, the water-based ink using the pigment water dispersion of the present invention can be suitably used as a water-based ink for flexographic printing, gravure printing or ink-jet printing. In addition, the water-based ink using the pigment water dispersion of the present invention is excellent in continuous ejection stability when used in the ink-jet printing methods, and therefore is preferably used as a water-based ink for ink-jet printing.

The reason why the pigment water dispersion of the present invention is excellent in continuous ejection stability, storage stability and solvent resistance when compounded in an ink is considered as follows though it is not clearly determined yet.

That is, it is considered that not only the pigment-containing polymer particles, but also the unadsorbed polymer are present in the pigment water dispersion. When reacting such an unadsorbed polymer with a specific epoxy-based crosslinking agent having an adequate hydrophobicity, it is considered that the unadsorbed polymer thus reacted is rendered readily adsorbable onto the hydrophobic pigment-containing polymer particles, and further when reacting the polymer adsorbed onto the particles with the polymer contained in the particles, the former polymer is firmly fixed onto the surface of the pigment, so that the amount of the unadsorbed polymer dispersed in the pigment water dispersion is reduced. As a result, it is considered that since the amount of the polymer adsorbed onto the surface of the pigment is increased and the charge-shielding effect of the unadsorbed polymer is reduced, a steric repulsion force and/or an electrostatic repulsion force can stably act between the pigment-containing crosslinked polymer particles, so that the resulting pigment water dispersion can be improved in colloid stability and can be prevented from suffering from precipitation or flocculation of the pigment-containing crosslinked polymer particles in ink-jet nozzles, and further can exhibit such an excellent effect that the resulting ink can be improved in continuous ejection stability.

At this time, if the crosslinking agent used is excessively hydrophobic, the reactivity of the crosslinking agent with the unadsorbed polymer tends to be lowered, whereas if the crosslinking agent used is excessively hydrophilic, the crosslinking agent tends to remain in the water phase even after being reacted with the unadsorbed polymer. Therefore, it is considered that the use of the specific epoxy-based crosslinking agent having an adequate hydrophobicity which is represented by the aforementioned formula (1) highly contributes to the aforementioned advantageous effects of the present invention.

In addition, it is considered that the pigment-containing crosslinked polymer particles can be stably dispersed even in an aqueous vehicle containing a relatively large amount of a solvent without desorption of the polymer from the pigment even in the solvent because the polymer is fixed on the surface of the pigment owing to its crosslinked structure, so that the resulting pigment water dispersion can exhibit advantageous effects such as excellent storage stability and solvent resistance owing to an adequate hydrophobicity of the crosslinked structure derived from the crosslinking agent.

<Pigment>

The pigment-containing crosslinked polymer particles used in the present invention contains the pigment and the crosslinked polymer. The pigment used in the present invention may be either an inorganic pigment or an organic pigment.

Examples of the inorganic pigment include carbon blacks, metal oxides and the like. Of these inorganic pigments, in particular, carbon blacks are preferably used for black inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the tradenames of C.I. Pigment Yellow, C.I. Pigment Red, C.I. Pigment Violet, C.I. Pigment Blue, C.I. Pigment Green and C.I. Pigment Black with various product numbers. Further specific examples of the organic pigments include C.I. Pigment Yellow 74 (hereinafter also referred to merely as "PY74"), C.I. Pigment Red 122 (hereinafter also referred to merely as "PR122"), C.I. Pigment Blue 15:3 (hereinafter also referred to merely as "PB15:3") and C.I. Pigment Black 7 (hereinafter also referred to merely as "PB7").

The hue of the pigment used in the present invention is not particularly limited, and there may be used any of chromatic color pigments having a yellow color, a magenta color, a cyan color, a red color, a blue color, an orange color, a green color, etc., and black achromatic color pigments.

In the present invention, there may also be used a self-dispersible pigment. The self-dispersible pigment as used herein means an inorganic or organic pigment onto a surface of which at least one hydrophilic functional group (including an anionic hydrophilic group such as a carboxy group and a sulfonic group or a cationic hydrophilic group such as a quaternary ammonium group) is bonded either directly or through the other atom group to thereby render the pigment dispersible in an aqueous medium without using a surfactant or a resin. Examples of the other atom group used herein include an alkanediyl group having not less than 1 and not more than 12 carbon atoms, a phenylene group and a naphthylene group.

In order to form a pigment into a self-dispersible pigment, for example, a necessary amount of a hydrophilic functional group may be chemically bonded to the surface of the pigment by an ordinary method. More specifically, there is preferably used a method of subjecting the pigment to liquid phase oxidation with acids such as nitric acid, sulfuric acid, peroxodisulfuric acid, hypochlorous acid and chromic acid or a method of bonding a hydrophilic functional group to the pigment using a coupling agent.

The amount of the hydrophilic functional group to be bonded to the surface of the self-dispersible pigment is not particularly limited, and is preferably not less than 100 µmol and not more than 3,000 µmol per 1 g of the self-dispersible pigment. The amount of a carboxy group as the hydrophilic functional group bonded to the surface of the self-dispersible pigment is preferably not less than 200 µmol and not more than 700 µmol per 1 g of the self-dispersible pigment.

Specific examples of commercially available products of the self-dispersible pigment containing a carboxy group include "CAB-O-JET 200", "CAB-O-JET 300", "CAB-O-JET 352K", "CAB-O-JET 250C", "CAB-O-JET 260M", "CAB-O-JET 270Y", "CAB-O-JET 450C", "CAB-O-JET 465M", "CAB-O-JET 470Y" and "CAB-O-JET 480V" all available from Cabot Corporation, "BONJET CW-1" and "BONJET CW-2" both available from Orient Chemical Industries Co., Ltd., "Aqua-Black 162" available from Tokai Carbon Co., Ltd., and "Sensijet Black SDP-100", "Sensijet Black SDP-1000" and "Sensijet Black SDP-2000" all available from Sensient Technologies Corporation.

The aforementioned pigments may be used alone or in combination of a any two or more thereof at an optional ratio.

<Crosslinked Polymer>

The crosslinked polymer used in the present invention is a polymer that is obtained by crosslinking the water-dispersible polymer with the crosslinking agent represented by the aforementioned formula (1), and has a crosslinked structure derived from the crosslinking agent. From the viewpoint of improving dispersion stability of the pigment water dispersion as well as from viewpoint of improving storage stability of the resulting ink, the crosslinked polymer is preferably in the form of a crosslinked product of the water-dispersible polymer adsorbed onto the surface of the pigment by the crosslinking agent represented by the aforementioned formula (1).

The water-dispersible polymer as used in the present invention means a polymer before being crosslinked, and also means a polymer having a capability of dispersing the pigment in water or an aqueous medium containing water as a main component at an ordinary temperature.

Examples of the water-dispersible polymer include polyesters, polyurethanes and vinyl-based polymers. Among these polymers, from the viewpoint of improving dispersion stability of the pigment water dispersion as well as from the viewpoint of improving storage stability of the resulting ink, preferred are vinyl-based polymers obtained by subjecting vinyl monomers to addition polymerization.

The water-dispersible polymer used in the present invention contains a reactive group (crosslinkable functional group) capable of reacting with the crosslinking agent (a dihydric alcohol diglycidyl ether) represented by the aforementioned formula (1). Examples of the reactive group include a salt-forming group such as a carboxy group, a sulfonic group, a phosphoric group and an amino group, a hydrophilic functional group such as a hydroxy group, etc. Among these reactive groups, from the viewpoint of improving reaction stability of the crosslinking reaction, preferred is a salt-forming group, and more preferred is a carboxy group. Examples of the carboxy group-containing polymer include (meth)acrylic acid-based polymers.

Meanwhile, the term "(meth)acrylic acid" as used in the present specification means "acrylic acid or methacrylic acid", and the "(meth)acrylic acid" as described hereinafter is also defined in the same way.

The water-dispersible polymer is preferably a vinyl-based polymer that contains a constitutional unit derived from (a) a hydrophobic monomer (hereinafter also referred to merely as a "component (a)") and a constitutional unit derived from (b) an ionic monomer (hereinafter also referred to merely as a "component (b)") and more preferably a vinyl-based polymer that further contains a constitutional unit derived from (c) a nonionic monomer (hereinafter also referred to merely as a "component (c)") in addition to the components (a) and (b), from the viewpoint of improving dispersion stability of the pigment water dispersion as well as from the viewpoint of improving storage stability of the resulting ink. The vinyl-based polymer is produced by copolymerizing a monomer mixture containing the component (a) and the component (b), and further containing the component (c), if required (such a mixture is hereinafter also referred to merely as a "monomer mixture").

((a) Hydrophobic Monomer)

The water-dispersible polymer preferably contains a constitutional unit derived from the hydrophobic monomer (a) from the viewpoint of improving dispersion stability of the pigment water dispersion as well as from the viewpoint of improving storage stability of the resulting ink. The hydrophobic monomer (a) means such a monomer having a solubility in 100 g of ion-exchanged water at 25° C. of less than 10 g. As the hydrophobic monomer (a), there may be mentioned an aromatic group-containing monomer, a (meth) acrylate containing a hydrocarbon group derived from an aliphatic alcohol and the like.

The aromatic group-containing monomer is preferably a vinyl monomer containing an aromatic group having not less than 6 and not more than 22 carbon atoms, and more preferably at least one monomer selected from the group consisting of a styrene-based monomer and an aromatic group-containing (meth)acrylate. As the styrene-based monomer, preferred is at least one monomer selected from the group consisting of styrene and 2-methyl styrene, and more preferred is styrene. As the aromatic group-containing (meth)acrylate, preferred is at least one monomer selected from the group consisting of benzyl (meth)acrylate and phenoxyethyl (meth)acrylate, and more preferred is benzyl (meth)acrylate.

Among these monomers, from the viewpoint of improving dispersion stability of the pigment water dispersion as well as from the viewpoint of improving storage stability of the resulting ink, preferred is the aromatic group-containing (meth)acrylate. In addition, the aromatic group-containing (meth)acrylate may also be used in combination with the styrene-based monomer.

Meanwhile, the term "(meth)acrylate" as used in the present specification means at least one compound selected from the group consisting of an acrylate and a methacrylate, and the "(meth)acrylate" as described hereinafter is also defined in the same way.

As the (meth)acrylate containing a hydrocarbon group derived from an aliphatic alcohol, preferred are those (meth) acrylates containing a hydrocarbon group derived from an aliphatic alcohol having not less than 1 and not more than 22 carbon atoms, more preferred are those (meth)acrylates containing an alkyl group having not less than 1 and not more than 22 carbon atoms, and even more preferred are those (meth)acrylates containing an alkyl group having not less than 6 and not more than 18 carbon atoms. Examples of the (meth)acrylate containing a hydrocarbon group derived from an aliphatic alcohol include methyl (meth)acrylate, ethyl (meth)acrylate, propyl (meth)acrylate, butyl (meth) acrylate, amyl (meth)acrylate, cyclohexyl (meth)acrylate, 2-ethylhexyl (meth)acrylate, octyl (meth)acrylate, decyl (meth)acrylate, dodecyl (meth)acrylate, stearyl (meth)acrylate, isopropyl (meth)acrylate, isobutyl (meth)acrylate, tertbutyl (meth)acrylate, isoamyl (meth)acrylate, isooctyl (meth)acrylate, isodecyl (meth)acrylate, isododecyl (meth) acrylate and isostearyl (meth)acrylate.

As the hydrophobic monomer (a), a macromer is also preferably used. The macromer is in the form of a compound containing a polymerizable functional group at one terminal end thereof and having a number-average molecular weight of not less than 500 and not more than 100,000. From the viewpoint of improving dispersion stability of the pigment water dispersion as well as from the viewpoint of improving storage stability of the resulting ink, the macromer is preferably in the form of a compound having a number-average molecular weight of not less than 1,000 and not more than 10,000. Meanwhile, the number-average molecular weight of the macromer is the value that is measured by gel permeation chromatography using chloroform containing 1 mmol/L of dodecyl dimethylamine as a solvent and using a polystyrene as a reference standard substance.

As the polymerizable functional group bonded to one terminal end of the macromer, preferred are an acryloyloxy group and a methacryloyloxy group, and more preferred is a methacryloyloxy group.

As the macromer, from the viewpoint of improving dispersion stability of the pigment water dispersion as well as from the viewpoint of improving storage stability of the resulting ink, preferred is at least one macromer selected from the group consisting of an aromatic group-containing monomer-based macromer and a silicone-based macromer, and more preferred is an aromatic group-containing monomer-based macromer.

Examples of an aromatic group-containing monomer constituting the aromatic group-containing monomer-based macromer include the same aromatic group-containing monomers as described with respect to the aforementioned hydrophobic monomer (a). Among these aromatic group-containing monomers, preferred are styrene and benzyl (meth)acrylate, and more preferred is styrene.

Specific examples of the styrene-based macromer include "AS-6(S)", "AN-6(S)" and "HS-6(S)" (tradenames) all available from Toagosei Co., Ltd., etc.

Examples of the silicone-based macromer include organopolysiloxanes containing a polymerizable functional group at one terminal end thereof, etc.

From the viewpoint of improving dispersion stability of the pigment water dispersion as well as from the viewpoint of improving storage stability of the resulting ink, the hydrophobic monomer (a) is preferably at least one monomer selected from the group consisting of an aromatic group-containing monomer, a (meth)acrylate containing a hydrocarbon group derived from an aliphatic alcohol and an aromatic group-containing monomer-based macromer, more preferably at least one monomer selected from the group consisting of an aromatic group-containing monomer and an aromatic group-containing monomer-based macromer, even more preferably at least one monomer selected from the group consisting of an aromatic group-containing (meth) acrylate and a styrene-based macromer, and further even more preferably a combination of an aromatic group-containing (meth)acrylate and a styrene-based macromer.

((b) Ionic Monomer)

The water-dispersible polymer preferably contains a constitutional unit derived from the ionic monomer (b) from the viewpoint of improving dispersion stability of the pigment water dispersion as well as from the viewpoint of improving storage stability of the resulting ink. The ionic monomer (b) is such a monomer that an amount of either the monomer or a salt thereof which can be dissolved in 100 g of ion-exchanged water is more than 1 g as measured at 20° C. The ionic monomer (b) preferably contains a reactive group capable of reacting with the aforementioned crosslinking agent from the viewpoint of improving dispersion stability of the pigment water dispersion as well as from the viewpoint of improving storage stability, continuous ejection stability and solvent resistance of the resulting ink. As the reactive group, there may be used the same reactive groups as described above. Examples of the ionic monomer include an anionic monomer and a cationic monomer which respectively contain the aforementioned reactive group. Among these ionic monomers, from the viewpoint of improving dispersion stability of the pigment water dispersion as well as from the viewpoint of improving storage stability, continuous ejection stability and solvent resistance of the resulting ink, preferred is the anionic monomer containing the aforementioned reactive group.

Examples of the anionic monomer containing the reactive group include carboxylic acid monomers, sulfonic acid monomers and phosphoric acid monomers.

Specific examples of the carboxylic acid monomers include (meth)acrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid and 3-sulfopropyl (meth)acrylate.

Specific examples of the phosphoric acid monomers include vinylphosphonic acid, vinyl phosphate, bis(meth-acryloyloxyethyl)phosphate, diphenyl-2-acryloyloxyethyl phosphate and diphenyl-2-methacryloyloxyethyl phosphate.

Among the anionic monomers, from the viewpoint of improving dispersion stability of the pigment water dispersion as well as from the viewpoint of improving storage stability, continuous ejection stability and solvent resistance of the resulting ink, preferred are the carboxylic acid monomers, more preferred is (meth)acrylic acid, and even more preferred is methacrylic acid.

((c) Nonionic Monomer)

Examples of the nonionic monomer (c) include hydroxyalkyl (meth)acrylates such as 2-hydroxyethyl (meth)acrylate and 3-hydroxypropyl (meth)acrylate; polyalkylene glycol (meth)acrylates such as polypropylene glycol (n=2 to 30 wherein n represents an average molar number of addition of oxyalkylene groups: hereinafter defined in the same way) (meth)acrylates; alkoxy polyalkylene glycol (meth)acrylates such as methoxy polyethylene glycol (n=1 to 30) (meth) acrylates and octoxy polyethylene glycol (n=1 to 30) (meth) acrylates; and aralkoxy polyalkylene glycol (meth)acrylates such as phenoxy (ethylene glycol/propylene glycol copolymer) (n=1 to 30 in which n for ethylene glycol: 1 to 29) (meth)acrylates. Among these nonionic monomers, preferred are alkoxy polyalkylene glycol (meth)acrylates, and more preferred are octoxy polyethylene glycol (n=1 to 30) (meth)acrylates.

Specific examples of commercially available products of the nonionic monomer (c) include "NK ESTER M-20G", "NK ESTER M-40G", "NK ESTER M-90G" and "NK ESTER EH-4E" (tradenames) all available from Shin-Nakamura Chemical Co., Ltd.; and "BLEMMER PE-90", "BLEMMER PE-200" and "BLEMMER PE-350"; "BLEMMER PME-100", "BLEMMER PME-200" and "BLEMMER PME-400"; "BLEMMER PP-500" and "BLEMMER PP-800"; "BLEMMER AP-150", "BLEMMER AP-400" and "BLEMMER AP-550"; and "BLEMMER 50PEP-300", "BLEMMER 50POEP-800B" and "BLEMMER 43PAPE-600B" (tradenames) all available from NOF Corporation. Of these commercially available products of the nonionic monomers (c), from the viewpoint of improving dispersion stability of the pigment water dispersion as well as from the viewpoint of improving storage stability of the resulting ink, "NK ESTER EH-4E" (octoxy polyethylene glycol methacrylate; average molar number of addition of ethyleneoxide: 4) is preferably used.

From the viewpoint of improving dispersion stability of the pigment water dispersion as well as from the viewpoint of improving storage stability, continuous ejection stability and solvent resistance of the resulting ink, the nonionic monomer (c) may contain a hydroxy group capable of reacting with the aforementioned crosslinking agent.

The aforementioned components (a) to (c) may be respectively used alone or in combination of any two or more thereof.

Upon production of the water-dispersible polymer, the contents of the aforementioned components (a) to (c) in the monomer mixture (contents of non-neutralized components; hereinafter defined in the same way), i.e., the contents of the constitutional units derived from the components (a) to (c), respectively, in the water-dispersible polymer are as follows.

The content of the component (a) is preferably not less than 40% by mass, more preferably not less than 45% by mass and even more preferably not less than 48% by mass, and is also preferably not more than 85% by mass, more preferably not more than 80% by mass and even more preferably not more than 75% by mass, from the viewpoint of improving dispersion stability of the pigment water dispersion as well as from the viewpoint of improving storage stability and continuous ejection stability of the resulting ink.

The content of the component (b) is preferably not less than 10% by mass, more preferably not less than 13% by mass and even more preferably not less than 15% by mass, and is also preferably not more than 25% by mass, more preferably not more than 23% by mass and even more preferably not more than 21% by mass, from the viewpoint of improving dispersion stability of the pigment water dispersion as well as from the viewpoint of improving storage stability, continuous ejection stability and solvent resistance of the resulting ink.

In the case of further using the component (c), the content of the component (c) is preferably not less than 0.1% by mass, more preferably not less than 10% by mass and even more preferably not less than 20% by mass, and is also preferably not more than 40% by mass, more preferably not more than 35% by mass and even more preferably not more than 31% by mass, from the viewpoint of improving dispersion stability of the pigment water dispersion as well as from the viewpoint of improving storage stability and continuous ejection stability of the resulting ink.

(Production of Water-Dispersible Polymer)

The water-dispersible polymer may be produced by copolymerizing a monomer mixture containing the aforementioned hydrophobic monomer (a) and ionic monomer (b), and if required, further containing the aforementioned nonionic monomer (c) and the other monomers, by known polymerization methods. Among the polymerization methods, preferred is a solution polymerization method.

The organic solvent used in the solution polymerization method is not particularly limited, and methyl ethyl ketone, methyl isobutyl ketone, toluene, etc., are preferably used from the viewpoint of attaining good copolymerizability of the monomers.

The polymerization may be carried out in the presence of a polymerization initiator or a chain transfer agent. As the polymerization initiator, preferred are azo compounds, and more preferred is 2,2'-azobis(2,4-dimethylvaleronitrile).

As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C., more preferably not lower than 60° C. and even more preferably not lower than 70° C., and is also preferably not higher than 90° C. and more preferably not higher than 85° C. The polymerization time is preferably not less than 1 hour, more preferably not less than 4 hours and even more preferably not less than 6 hours, and is also preferably not more than 20 hours, more preferably not more than 15 hours and even more preferably not more than 10 hours. In addition, the polymerization is preferably conducted in a nitrogen gas atmosphere or an atmosphere of an inert gas such as argon.

After completion of the polymerization reaction, unreacted monomers, etc., may be removed from the obtained reaction solution by reprecipitation, membrane separation, chromatography, extraction, etc.

From the viewpoints of improving dispersion stability of the pigment water dispersion as well as from the viewpoint of improving storage stability and continuous ejection stability of the resulting ink, the weight-average molecular weight of the water-dispersible polymer is preferably not less than 3,000, more preferably not less than 5,000, even more preferably not less than 10,000 and further even more preferably not less than 30,000, and is also preferably not more than 200,000, more preferably not more than 100,000, even more preferably not more than 80,000 and further even more preferably not more than 60,000.

Meanwhile, the weight-average molecular weight of the water-dispersible polymer may be measured by the method described in Examples below.

The acid value of the water-dispersible polymer is preferably not less than 100 mgKOH/g, more preferably not less than 120 mgKOH/g and even more preferably not less than 150 mgKOH/g, and is also preferably not more than 300 mgKOH/g, more preferably not more than 280 mgKOH/g, even more preferably not more than 250 mgKOH/g and further even more preferably not more than 200 mgKOH/g.

Meanwhile, the acid value of the water-dispersible polymer may be calculated from a ratio between the monomer components used upon production of the polymer. Alternatively, the acid value of the water-dispersible polymer may also be determined by the method of subjecting a solution prepared by dissolving the water-dispersible polymer in a solvent capable of dissolving the polymer therein, such as methyl ethyl ketone, to titration with an alkali agent.

<Crosslinking Agent>

The crosslinking agent used in the present invention is a dihydric alcohol diglycidyl ether represented by the following general formula (1):

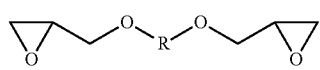
(1)

wherein R is an aliphatic hydrocarbon group having not less than 6 and not more than 14 carbon atoms.

In the aforementioned formula (1), R is an aliphatic hydrocarbon group derived from a dihydric alcohol. Examples of the dihydric alcohol include α,ω-linear alkanediols, 1,2-alkanediols and cyclohexane dialkyl alcohols, which have not less than 6 and not more than 14 carbon atoms.

Examples of R as the hydrocarbon group include a linear or branched aliphatic hydrocarbon group and an alicyclic-aliphatic hydrocarbon group. The number of carbon atoms of R as the hydrocarbon group is not less than 6, and is also not more than 14, preferably not more than 10 and even more preferably not more than 8, from the viewpoint of improving absorptivity of the polymer onto the surface of the pigment.

Specific examples of the crosslinking agent include a dihydric alcohol diglycidyl ether containing a linear aliphatic hydrocarbon group, such as 1,6-hexanediol diglycidyl ether, 1,8-octanediol diglycidyl ether, 1,10-decanediol diglycidyl ether, 1,12-dodecanediol diglycidyl ether and 1,14-tetradecanediol diglycidyl ether; a dihydric alcohol diglycidyl ether containing a branched aliphatic hydrocarbon group, such as 1,2-hexanediol diglycidyl ether and 1,2-octanediol diglycidyl ether; and a dihydric alcohol diglycidyl ether containing an alicyclic-aliphatic hydrocarbon group, such as 1,4-cyclohexanedimethanol diglycidyl ether, 1,4-cyclohexanediethanol diglycidyl ether and 2-methyl-1,4-cyclohexanedimethanol diglycidyl ether. Among these dihydric alcohol diglycidyl ethers, preferred are 1,6-hexanediol diglycidyl ether and 1,4-cyclohexanedimethanol diglycidyl ether. These dihydric alcohol diglycidyl ethers may be used alone or in combination of any two or more thereof.

In the case where the pigment used is at least one pigment selected from the group consisting of PB15:3 and PB7, from the viewpoint of improving continuous ejection stability and storage stability of the resulting ink, as the crosslinking agent, preferred are dihydric alcohol diglycidyl ethers represented by the aforementioned formula (1) in which R is a linear or branched aliphatic hydrocarbon group, and more preferred are dihydric alcohol diglycidyl ethers derived from at least one dihydric alcohol selected from the group consisting of α,ω-linear alkanediols and 1,2-alkanediols, which have not less than 6 and not more than 14 carbon atoms. Also, in the case where the pigment used is at least one pigment selected from the group consisting of PY74 and PR122, from the viewpoint of improving continuous ejection stability and storage stability of the resulting ink, as the crosslinking agent, preferred are dihydric alcohol diglycidyl ethers represented by the aforementioned formula (1) in which R is an alicyclic-aliphatic hydrocarbon group, and more preferred are dihydric alcohol diglycidyl ethers derived from cyclohexane dialkyl alcohols.

Specific examples of the commercially available crosslinking agents include "DENACOL EX-212" (1,6-hexanediol diglycidyl ether), "DENACOL EX-212L" (1,6-hexanediol diglycidyl ether), "DENACOL EX-216" (1,4-cyclohexanedimethanol diglycidyl ether) and "DENACOL EX-216L" (1,4-cyclohexanedimethanol diglycidyl ether) all available from Nagase ChemteX Corporation; "EPOLIGHT 1600" (1,6-hexanediol diglycidyl ether) available from KYOEISHA CHEMICAL Co., Ltd.; and "RIKARESIN DME-100" (1,4-cyclohexanedimethanol diglycidyl ether) available from NEW JAPAN CHEMICAL Co., Ltd., etc.

The rate of dissolution of the crosslinking agent in water (hereinafter also referred to merely as a "dissolution rate") is preferably not more than 20% by mass, more preferably not more than 10% by mass and even more preferably not more than 5.0% by mass, and is also not less than 0% by mass and preferably substantially 0% by mass, from the viewpoint of improving adsorptivity of the polymer onto the surface of the pigment.

Meanwhile, the "dissolution rate" as used herein means a rate (% by mass) of dissolution of the crosslinking agent as measured by dissolving 10 parts by mass of the crosslinking agent in 90 parts by mass of pure water at 25° C.

The crosslinking agent represented by the aforementioned formula (1) is usually produced from epichlorohydrin, and therefore chlorine may be contained in the crosslinking agent. When the crosslinking agent has a large chlorine content, there tends to occur such a risk that a printing apparatus such as an ink-jet printer suffers from corrosion. In addition, in the case where the ink is ejected by a thermal method in the ink-jet printing methods, there tends to occur such a risk that the ink is inhibited from exhibiting improved continuous ejection stability owing to corrosion of a heater in a thermal print head. From these viewpoints, the content of chlorine in the crosslinking agent (chlorine content) is preferably not more than 8.0% by mass, more preferably not more than 5.0% by mass, even more preferably not more than 3.0% by mass, further even more preferably not more than 1.0% by mass and still further even more preferably not more than 0.5% by mass. In addition, from the viewpoint of improving productivity of the crosslinking agent, the content of chlorine in the crosslinking agent is preferably not less than 0% by mass and more preferably not less than 0.1% by mass.

It is considered that the chlorine in the crosslinking agent is present in the form of a chloride ion as an impurity. The content of chlorine in the crosslinking agent may be determined from a chloride ion concentration thereof as measured by a titration method or an ion chromatography. More specifically, the preferred range of the content of a chloride ion as an impurity in the crosslinking agent is the same as the preferred range of the content of chlorine in the crosslinking agent (chlorine content).

(Process for Producing Pigment Water Dispersion)

The pigment water dispersion of the present invention can be efficiently produced by the process including the following steps (1) and (2):

Step (1): subjecting a pigment mixture containing a pigment, a water-dispersible polymer and water to dispersion treatment, thereby obtaining an aqueous pigment dispersion solution containing pigment-containing polymer particles; and Step (2): mixing the aqueous pigment dispersion solution obtained in the step (1) and a crosslinking agent represented by the aforementioned formula (1) to react the water-dispersible polymer with the crosslinking agent, thereby obtaining a pigment water dispersion containing pigment-containing crosslinked polymer particles.

<Step (1)>

The step (1) is the step of subjecting a pigment mixture containing the pigment, the water-dispersible polymer and water to dispersion treatment, thereby obtaining an aqueous pigment dispersion solution containing pigment-containing polymer particles.

The step (1) is preferably the step of mixing the pigment, the water-dispersible polymer and water, if required, together with a neutralizing agent, a surfactant, etc., to obtain the pigment mixture, and then subjecting the thus obtained pigment mixture to dispersion treatment, thereby obtaining the aqueous pigment dispersion solution. The order of addition of the respective components is not particularly limited, and it is preferred that the neutralizing agent, water and the pigment are successively added in this order.

(Neutralizing Agent)

In the step (1), from the viewpoint of improving dispersion stability of the aqueous pigment dispersion solution as well as from the viewpoint of improving storage stability and continuous ejection stability of the resulting ink, a neutralizing agent is preferably used. When using the neutralizing agent, the neutralization is preferably conducted such that the pH value of the aqueous pigment dispersion solution lies within the range of not less than 7 and not more than 11.

Examples of the neutralizing agent used in the step (1) include hydroxides of alkali metals, ammonia and organic amines. Of these neutralizing agents, from the viewpoint of improving dispersion stability of the aqueous pigment dispersion solution as well as from the viewpoint of improving storage stability and continuous ejection stability of the resulting ink, preferred are hydroxides of alkali metals and ammonia, and more preferred are hydroxides of alkali metals.

Specific examples of the hydroxides of alkali metals include lithium hydroxide, sodium hydroxide, potassium hydroxide and cesium hydroxide. Of these hydroxides of alkali metals, preferred is sodium hydroxide.

The neutralizing agent is preferably used in the form of an aqueous neutralizing agent solution from the viewpoint of sufficiently promoting neutralization of the polymer. From the viewpoint of sufficiently promoting neutralization of the polymer, the concentration of the aqueous neutralizing agent solution is preferably not less than 3.0% by mass, more preferably not less than 10% by mass and even more preferably not less than 15% by mass, and is also preferably not more than 30% by mass and more preferably not more than 25% by mass.

The neutralizing agent and the aqueous neutralizing agent solution are respectively used alone or in a mixture of any two or more kinds thereof.

The degree of neutralization of the water-dispersible polymer is preferably not less than 60 mol %, more preferably not less than 80 mol % and even more preferably not less than 100 mol %, and is also preferably not more than 400 mol %, more preferably not more than 200 mol % and even more preferably not more than 150 mol %, from the viewpoint of improving dispersion stability of the aqueous pigment dispersion solution as well as from the viewpoint of improving storage stability and continuous ejection stability of the resulting ink.

The degree of neutralization as used herein means the value obtained by dividing a mole equivalent value of the neutralizing agent by a molar amount of the anionic group in the water-dispersible polymer. Inherently, the degree of neutralization of the polymer does not exceed 100 mol %. However, in the present invention, since the degree of neutralization of the polymer is calculated from an amount of the neutralizing agent used, if the neutralizing agent is used in an excessive amount relative to the polymer, the degree of neutralization of the polymer will exceed 100 mol %. The aforementioned anionic group may include a carboxy group of the ionic monomer, etc.

In addition, in the case where the volatile base is used as the neutralizing agent, it is possible to suitably control not only the degree of neutralization of the pigment mixture in the course of the step (1), but also the degree of neutralization of each of the aqueous pigment dispersion solution produced in a final stage of the step (1) and the pigment water dispersion obtained in the step (2). More specifically, the volatile base such as ammonia, etc., used as the neutralizing agent is charged in an excessive amount relative to a molar amount of the anionic group of the water-dispersible polymer in the course of the step (1), and then removed in the final stage of the step (1), whereby it is possible to obtain the aqueous pigment dispersion solution having a desired neutralization degree. In such a case, the amount of the volatile base used as the neutralizing agent is not less than 0 mol %, and is also preferably not more than 300 mol %, more preferably not more than 100 mol % and even more preferably not more than 50 mol %.

The content of the pigment in the pigment mixture is preferably not less than 5.0% by mass, more preferably not less than 8.0% by mass and even more preferably not less than 10% by mass, and is also preferably not more than 30% by mass, more preferably not more than 25% by mass and even more preferably not more than 20% by mass, from the viewpoint of improving dispersion stability of the aqueous pigment dispersion solution and enhancing productivity of the aqueous pigment dispersion solution as well as from the viewpoint of improving storage stability and continuous ejection stability of the resulting ink.

The mass ratio of the pigment to the water-dispersible polymer [pigment/water-dispersible polymer] in the pigment mixture is preferably from 80/20 to 50/50, more preferably from 75/25 to 60/40 and even more preferably from 70/30 to 65/45, from the viewpoint of improving dispersion stability of the aqueous pigment dispersion solution as well as from the viewpoint of improving storage stability and continuous ejection stability of the resulting ink.

In the step (1), the resulting pigment mixture is further subjected to dispersing treatment to obtain the aqueous pigment dispersion solution. The dispersing method for obtaining the aqueous pigment dispersion solution is not particularly limited. The pigment particles may be atomized into fine particles having a desired average particle size by subjecting the pigment mixture to a substantial dispersion treatment only. However, it is preferred that the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step (1) is preferably not lower than 0° C., and is also preferably not higher than 40° C., more preferably not higher than 30° C. and even more preferably not higher than 20° C. The dispersing time of the aforementioned dispersion treatment is preferably not less than 1 hour and more preferably not less than 2 hours, and is also preferably not more than 30 hours, more preferably not more than 10 hours and even more preferably not more than 5 hours.

When subjecting the aforementioned pigment mixture to the preliminary dispersion treatment, there may be used ordinary mixing and stirring devices such as an anchor blade and a disper blade. Of these mixing and stirring devices, preferred are high-speed stirring mixers.

As a means for applying a shear stress to the pigment mixture in the substantial dispersion treatment, there may be used, for example, kneading machines such as roll mills, kneaders and the like, high-pressure homogenizers such as "Microfluidizer" (tradename) available from Microfluidics Corporation, and media-type dispersers such as paint shakers and beads mills. Examples of the commercially available media-type dispersers include "Ultra Apex Mill" (tradename) available from Kotobuki Industries Co., Ltd., and "Pico Mill" (tradename) available from Asada Iron Works Co., Ltd. These devices may be used in combination of any two or more thereof. Among these devices, the high-pressure homogenizers are preferably used from the viewpoint of reducing the particle size of the pigment.

In the case where the substantial dispersion treatment is conducted using the high-pressure homogenizer, the particle size of the pigment can be adjusted to a desired value by controlling the treating pressure and the number of passes of the pigment mixture through the homogenizer used in the substantial dispersion treatment. The treating pressure used in the substantial dispersion treatment is preferably not less than 60 MPa, more preferably not less than 100 MPa and even more preferably not less than 150 MPa, and is also preferably not more than 250 MPa, more preferably not more than 200 MPa and even more preferably not more than 180 MPa. Also, the number of passes of the pigment mixture through the homogenizer used in the substantial dispersion treatment is preferably not less than 3 times, more preferably not less than 10 times and even more preferably not less than 15 times, and is also preferably not more than 30 times, more preferably not more than 25 times and even more preferably not more than 20 times.

The step (1) preferably further includes the following steps (1-1) and (1-2) as the method in which before subjecting the pigment mixture to the dispersion treatment, the water-dispersible polymer is dissolved in an organic solvent, and then the dispersion treatment is conducted to obtain a dispersion treatment product, followed by removing the organic solvent therefrom.

Step (1-1): dissolving the water-dispersible polymer in an organic solvent and then adding the pigment and water to the resulting solution to prepare the pigment mixture, and thereafter subjecting the resulting pigment mixture to dispersion treatment, thereby obtaining the dispersion treatment product containing pigment-containing polymer particles; and Step (1-2): removing the organic solvent from the dispersion treatment product obtained in the step (1-1), thereby obtaining the aqueous pigment dispersion solution containing pigment-containing polymer particles.

[Step (1-1)]

In the step (1-1), it is preferred that the water-dispersible polymer is first dissolved in an organic solvent, and then the pigment and water are added, if required, together with the neutralizing agent, the surfactant, etc., to the resulting solution and mixed with each other, to obtain the dispersion treatment product in the form of an oil-in-water dispersion. The order of addition of the respective components in the step (1-1) is not particularly limited, and it is preferred that the neutralizing agent, water and the pigment are successively added in this order. In addition, the dispersing method used in the step (1-1) is the same as the dispersing method described previously, and the content of the pigment in the pigment mixture as well as the mass ratio of the pigment to the water-dispersible polymer are also the same as those described previously.

(Organic Solvent)

It is preferred that the organic solvent used in the step (1-1) has a high affinity to the water-dispersible polymer, and on the other hand, has a low solubility in water used as a main solvent in the step (1-1). More specifically, it is preferred that the solubility of the organic solvent in water as measured at 20° C. is less than 40% by mass.

Examples of the preferred organic solvent include at least one solvent selected from the group consisting of aliphatic alcohols, ketones, ethers and esters. Among these organic solvents, from the viewpoint of improving wettability to the pigment and adsorptivity of the water-dispersible polymer to the pigment, more preferred are ketones, and even more preferred is methyl ethyl ketone.

The mass ratio of the water-dispersible polymer to the organic solvent [water-dispersible polymer/organic solvent]

in step (1-1) is preferably not less than 0.10, more preferably not less than 0.20 and even more preferably not less than 0.25, and is also preferably not more than 0.60, more preferably not more than 0.50 and even more preferably not more than 0.45, from the viewpoint of improving wettability to the pigment and adsorptivity of the water-dispersible polymer to the pigment.

The mass ratio of the neutralizing agent to the organic solvent [neutralizing agent/organic solvent] in step (1-1) is preferably not less than 0.010, more preferably not less than 0.020 and even more preferably not less than 0.025, and is also preferably not more than 0.10, more preferably not more than 0.060 and even more preferably not more than 0.050, from the viewpoint of improving adsorptivity of the water-dispersible polymer to the pigment and promoting neutralization of the water-dispersible polymer to enhance dispersibility of the pigment-containing polymer particles, and as a result, from the viewpoint of preventing formation of coarse particles to improve continuous ejection stability of the resulting ink.

[Step (1-2)]

The step (1-2) is the step of removing the aforementioned organic solvent from the dispersion treatment product obtained in the step (1-1) by conventionally known methods to thereby obtain the aqueous pigment dispersion solution containing the pigment-containing polymer particles.

From the viewpoint of suppressing formation of aggregates in the course of removing the organic solvent, from the viewpoint of improving dispersion stability of the aqueous pigment dispersion solution as well as from the viewpoint of improving storage stability and continuous ejection stability of the resulting ink, it is preferred that water is added to the dispersion treatment product prior to removal of the organic solvent therefrom to suitably control a mass ratio of the organic solvent to water in the dispersion treatment product. The mass ratio of the organic solvent to water [organic solvent/water] in the dispersion treatment product after being controlled is preferably not less than 0.15 and more preferably not less than 0.20, and is also preferably not more than 0.40 and more preferably not more than 0.30.

In addition, the concentration of non-volatile components (solid content) in the dispersion treatment product obtained after controlling the mass ratio of the organic solvent to water therein is preferably not less than 5.0% by mass, more preferably not less than 10% by mass and even more preferably not less than 15% by mass, and is also preferably not more than 30% by mass, more preferably not more than 20% by mass and even more preferably not more than 18% by mass, from the viewpoints of suppressing formation of aggregates in the course of removing the organic solvent as well as from the viewpoint of enhancing productivity of the aqueous pigment dispersion solution. Meanwhile, in the step (1-2), a part of water contained in the aforementioned dispersion may be removed simultaneously with removal of the organic solvent.

Examples of the apparatus for removing the organic solvent used in the present step (1-2) include a thin film distillation apparatus such as a batch simple distillation device, a reduced pressure distillation device and a flush evaporator, a rotary distillation device and a stirring evaporator. Among these apparatuses, from the viewpoint of efficiently removing the organic solvent, preferred are a rotary distillation device and a stirring evaporator, more preferred is a rotary distillation device, and even more preferred is a rotary evaporator.

The temperature of the dispersion treatment product upon removing the organic solvent therefrom may be appropriately selected depending upon the kind of organic solvent to be removed. The temperature of the dispersion treatment product upon removing the organic solvent therefrom under reduced pressure is preferably not lower than 40° C., and is also preferably not higher than 80° C., more preferably not higher than 70° C. and even more preferably not higher than 65° C. The pressure of the reaction system upon removal of the organic solvent is preferably not less than 0.005 MPa and more preferably not less than 0.01 MPa, and is also preferably not more than 0.5 MPa, more preferably not more than 0.2 MPa and even more preferably not more than 0.1 MPa. The time required upon removal of the organic solvent is preferably not less than 1 hour, more preferably not less than 2 hours and even more preferably not less than 5 hours, and is also preferably not more than 24 hours, more preferably not more than 12 hours and even more preferably not more than 10 hours.

The organic solvent is preferably substantially completely removed from the thus obtained aqueous pigment dispersion solution. However, the residual organic solvent may be present in the aqueous pigment dispersion solution unless the objects and advantageous effects of the present invention are adversely affected by the residual organic solvent. The content of the residual organic solvent in the resulting aqueous pigment dispersion solution is preferably not more than 0.9% by mass, more preferably not more than 0.1% by mass and even more preferably not more than 0.01% by mass.

The concentration of the non-volatile components (solid content) in the aqueous pigment dispersion solution obtained in the step (1) is preferably not less than 10% by mass, more preferably not less than 15% by mass and even more preferably not less than 18% by mass, and is also preferably not more than 30% by mass, more preferably not more than 25% by mass and even more preferably not more than 22% by mass, from the viewpoint of improving dispersion stability of the aqueous pigment dispersion solution as well as from the viewpoint of facilitating production of the pigment water dispersion.

The average particle size of the pigment-containing polymer particles that are contained in the aqueous pigment dispersion solution obtained in the step (1) is preferably not less than 40 nm, more preferably not less than 50 nm and even more preferably not less than 60 nm, and is also preferably not more than 200 nm, more preferably not more than 150 nm and even more preferably not more than 130 nm, from the viewpoint of improving dispersion stability of the aqueous pigment dispersion solution as well as from the viewpoint of improving storage stability and continuous ejection stability of the resulting ink. The average particle size of the pigment-containing polymer particles may be measured by the same method as described in Examples below as the method of measuring an average particle size of pigment-containing crosslinked polymer particles in a water-based ink.

<Step (2)>

The step (2) is the step of mixing the aqueous pigment dispersion solution obtained in the step (1) and the crosslinking agent represented by the aforementioned formula (1) to react the water-dispersible polymer contained in the aqueous pigment dispersion solution with the crosslinking agent, thereby obtaining the pigment water dispersion containing the pigment-containing crosslinked polymer particles according to the present invention.

The catalyst, solvent, reaction temperature and reaction time used in the crosslinking reaction, etc., may be appropriately determined according to the crosslinking agent used therein. The temperature used in the crosslinking reaction is preferably not lower than 40° C. and more preferably not lower than 60° C., and is also preferably not higher than 95° C. and more preferably not higher than 80° C. The time of the crosslinking reaction is preferably not less than 0.5 hour and more preferably not less than 1 hour, and is also preferably not more than 10 hours, more preferably not more than 5 hours and even more preferably not more than 3 hours.

The amount of the crosslinking agent used in the crosslinking reaction is preferably not less than 0.5 part by mass, more preferably not less than 1.0 part by mass, even more preferably not less than 2.0 parts by mass, further even more preferably not less than 3.0 parts by mass and still further even more preferably not less than 4.0 parts by mass on the basis of 100 parts by mass of the water-dispersible polymer from the viewpoints of improving continuous ejection stability and solvent resistance of the resulting ink, and is also preferably not more than 15 parts by mass, more preferably not more than 13 parts by mass, even more preferably not more than 10 parts by mass and further even more preferably not more than 8.0 parts by mass on the basis of 100 parts by mass of the water-dispersible polymer from the viewpoint of improving continuous ejection stability and solvent resistance of the resulting ink.

The crosslinking rate of the crosslinked polymer is preferably not less than 5.0 equivalent % and more preferably not less than 8.0 equivalent %, and is also preferably not more than 90 equivalent %, more preferably not more than 70 equivalent %, even more preferably not more than 50 equivalent % and further even more preferably not more than 30 equivalent %. The crosslinking rate is the value obtained by dividing the number of equivalents of epoxy groups in the crosslinking agent by the number of equivalents of reactive groups (e.g., ionic groups) capable of reacting with the crosslinking agent in the water-dispersible polymer.

The pigment water dispersion of the present invention is in the form of a dispersion in which the pigment and the crosslinked polymer as solid components are dispersed in an aqueous medium containing water as a main medium.

In this case, the configuration of the pigment water dispersion is not particularly limited. Examples of the configuration of the pigment water dispersion include (1) the configuration in which the crosslinked polymer is adsorbed onto the surface of respective particles of the pigment to form dispersed particles containing a plurality of the pigment particles, (2) the configuration in which the pigment is enclosed or encapsulated in the crosslinked polymer and dispersed in the pigment water dispersion, (3) the configuration in which the pigment is exposed onto the surface of the respective crosslinked polymer particles and dispersed in the pigment water dispersion, and (4) a combination of these configurations such as the configuration in which the crosslinked polymer is partially adsorbed onto the surface of the respective particles of the pigment and dispersed in the pigment water dispersion, and the like.

(Composition and Properties of Pigment Water Dispersion)

The content of the pigment in the pigment water dispersion is preferably not less than 3.0% by mass, more preferably not less than 5.0% by mass and even more preferably not less than 7.0% by mass, and is also preferably not more than 20% by mass, more preferably not more than 17% by mass and even more preferably not more than 15% by mass, from the viewpoint of improving dispersion stability of the pigment water dispersion as well as from the viewpoint of improving continuous ejection stability and storage stability of the resulting ink.

The content of the crosslinked polymer in the pigment water dispersion is preferably not less than 0.5% by mass, more preferably not less than 1.0% by mass and even more preferably not less than 3.0% by mass, and is also preferably not more than 15% by mass, more preferably not more than 10% by mass and even more preferably not more than 7.0% by mass, from the viewpoint of improving dispersion stability of the pigment water dispersion as well as from the viewpoint of improving continuous ejection stability, storage stability and solvent resistance of the resulting ink.

The content of water in the pigment water dispersion is preferably not less than 50% by mass, more preferably not less than 60% by mass and even more preferably not less than 75% by mass, and is also preferably not more than 95% by mass and more preferably not more than 90% by mass, from the viewpoint of improving continuous ejection stability, storage stability and solvent resistance of the resulting ink.

The average particle size of the pigment-containing crosslinked polymer particles that are contained in the pigment water dispersion of the present invention is preferably not less than 40 nm, more preferably not less than 50 nm and even more preferably not less than 60 nm, and is also preferably not more than 200 nm, more preferably not more than 150 nm and even more preferably not more than 130 nm, from the viewpoint of improving dispersion stability of the pigment water dispersion as well as from the viewpoint of improving storage stability and continuous ejection stability of the resulting ink. The average particle size of the pigment-containing crosslinked polymer particles in the pigment water dispersion may be measured by the same method as described in Examples below as the method of measuring an average particle size of pigment-containing crosslinked polymer particles in a water-based ink.

The static surface tension of the pigment water dispersion as measured at 20° C. is preferably not less than 23 mN/m and more preferably not less than 25 mN/m, and is also preferably not more than 50 mN/m and more preferably not more than 48 mN/m, from the viewpoint of improving continuous ejection stability of the resulting ink.

Meanwhile, the static surface tension of the pigment water dispersion as measured at 20° C. may be measured by the method described in Examples below.

The viscosity of the pigment water dispersion as measured at 35° C. is preferably not less than 1.0 mPa·s, more preferably not less than 1.5 mPa·s and even more preferably not less than 2.0 mPa·s, and is also preferably not more than 10 mPa·s, more preferably not more than 7.0 mPa·s and even more preferably not more than 4.0 mPa·s, from the viewpoint of improving continuous ejection stability of the resulting ink.

Meanwhile, the viscosity of the pigment water dispersion as measured at 35° C. may be measured by the method described in Examples below.

The pigment water dispersion of the present invention may be mixed with various additives usually used in a water-based ink, e.g., such as a solvent, a penetrant, a dispersant, a surfactant, a viscosity controller, a defoaming agent, a rust preventive, an antiseptic agent, a mildew-proof agent and the like, and may be directly used as a water-based ink for flexographic printing, gravure printing or ink-jet printing, preferably as a water-based ink for ink-jet printing.

[Water-Based Ink for Ink-Jet Printing]

The water-based ink for ink-jet printing (hereinafter also referred to merely as a "water-based ink" or an "ink") contains the pigment water dispersion of the present invention, a solvent and water. The water-based ink may further contain, in addition to the solvent, various other additives such as a penetrant, a dispersant, a surfactant, a viscosity controller, a defoaming agent, a rust preventive, an antiseptic agent, a mildew-proof agent and the like.

<Pigment Water Dispersion>

The amount of the pigment water dispersion of the present invention compounded in the water-based ink is preferably not less than 15% by mass, more preferably not less than 20% by mass and even more preferably not less than 25% by mass, and is also preferably not more than 60% by mass, more preferably not more than 55% by mass and even more preferably not more than 50% by mass, from the viewpoint of improving storage stability, continuous ejection stability and solvent resistance of the resulting ink.

The content of the pigment in the water-based ink is preferably not less than 1.0% by mass, more preferably not less than 2.0% by mass and even more preferably not less than 3.0% by mass, and is also preferably not more than 20% by mass, more preferably not more than 15% by mass, even more preferably not more than 10% by mass and further even more preferably not more than 8.0% by mass, from the viewpoint of improving storage stability and continuous ejection stability of the resulting ink.

The content of the crosslinked polymer in the water-based ink is preferably not less than 0.10% by mass, more preferably not less than 0.15% by mass and even more preferably not less than 0.20% by mass, and is also preferably not more than 5.0% by mass, more preferably not more than 3.4% by mass and even more preferably not more than 2.5% by mass, from the viewpoint of improving storage stability and continuous ejection stability of the resulting ink.

<Solvent>

From the viewpoint of suppressing excessive increase in viscosity of the resulting ink owing to the crosslinked polymer, from the viewpoint of improving storage stability and continuous ejection stability of the ink as well as from the viewpoint of improving quality of printed characters or images, the water-based ink preferably contains an organic solvent as the solvent.

Examples of the organic solvent include glycol ethers, polyhydric alcohols, monohydric alcohols, alkyl ethers of these alcohols, nitrogen-containing heterocyclic compounds, amides, amines and sulfur-containing compounds. Among these organic solvents, from the viewpoint of improving continuous ejection stability and solvent resistance of the resulting ink, preferred is at least one organic solvent selected from the group consisting of glycol ethers, polyhydric alcohols and nitrogen-containing heterocyclic compounds.

Specific examples of the glycol ethers include alkylene glycol monoalkyl ethers, alkylene glycol dialkyl ethers and the like. Among these glycol ethers, from the viewpoint of improving solvent resistance of the resulting ink, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include ethylene glycol ethyl ether, ethylene glycol isopropyl ether, ethylene glycol propyl ether, ethylene glycol butyl ether, diethylene glycol methyl ether, diethylene glycol ethyl ether, diethylene glycol isopropyl ether, diethylene glycol isobutyl ether, diethylene glycol butyl ether, triethylene glycol methyl ether, dipropylene glycol methyl ether, dipropylene glycol ethyl ether, dipropylene glycol butyl ether and tripropylene glycol methyl ether, etc.

Of these alkylene glycol monoalkyl ethers, from the viewpoint of improving quality of printed characters or images, preferred is at least one compound selected from the group consisting of ethylene glycol isopropyl ether, ethylene glycol propyl ether, diethylene glycol methyl ether, diethylene glycol isopropyl ether, diethylene glycol isobutyl ether and diethylene glycol butyl ether, and more preferred is at least one compound selected from the group consisting of ethylene glycol isopropyl ether, diethylene glycol isopropyl ether and diethylene glycol isobutyl ether.

Examples of the polyhydric alcohols include 1,2-alkanediols such as ethylene glycol, propylene glycol, 1,2-butanediol, 1,2-pentanediol and 1,2-hexanediol, diethylene glycol, polyethylene glycol, dipropylene glycol, polypropylene glycol, 1,3-propanediol, 1,3-butanediol, 1,4-butanediol, 3-methyl-1,3-butanediol, 1,5-pentanediol, 2-methyl-2,4-pentanediol, 1,2,6-hexanetriol, 1,2,4-butanetriol, 1,2,3-butanetriol and petriol, etc.

Among these polyhydric alcohols, from the viewpoint of improving solvent resistance of the resulting ink, preferred is at least one compound selected from the group consisting of diethylene glycol butyl ether, dipropylene glycol methyl ether, dipropylene glycol ethyl ether, dipropylene glycol butyl ether, and alkanediols having not less than 2 and not more than 6 carbon atoms, such as propylene glycol, diethylene glycol, polyethylene glycol, polypropylene glycol and 1,2-hexanediol, and more preferred is at least one compound selected from the group consisting of propylene glycol and polyethylene glycol.

Examples of the nitrogen-containing heterocyclic compounds include 2-pyrrolidone, N-methyl-2-pyrrolidone, 1,3-dimethyl-2-imidazolidinone and ε-caprolactam.

Of these nitrogen-containing heterocyclic compounds, from the viewpoint of improving continuous ejection stability of the resulting ink, preferred is 2-pyrrolidone.

The content of the solvent in the water-based ink is preferably not less than 5.0% by mass and more preferably not less than 8.0% by mass, and is also preferably not more than 60% by mass, more preferably not more than 50% by mass, even more preferably not more than 40% by mass, further even more preferably not more than 30% by mass and still further even more preferably not more than 20% by mass, from the viewpoint of improving continuous ejection stability and solvent resistance of the resulting ink.

<Surfactant>

The water-based ink of the present invention may further contain a surfactant from the viewpoint of improving storage stability of the resulting ink. As the surfactant, there may be used at least one surfactant selected from the group consisting of a polyether-modified silicone-based surfactant and a nonionic surfactant.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (a trimethyleneoxy group or a propane-1,2-diyloxy group; PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

Examples of the nonionic surfactant include (1) alkyl ethers, alkenyl ethers, alkynyl ethers or aryl ethers of polyoxyalkylenes which are produced by adding ethyleneoxide, propyleneoxide or butyleneoxide (hereinafter collectively referred to as an "alkyleneoxide") to a saturated or unsaturated, linear or branched higher alcohol having not less than 8 and not more than 22 carbon atoms, a polyhydric alcohol or an aromatic alcohol, (2) esters of a higher alcohol containing a saturated or unsaturated, linear or branched hydrocarbon group having not less than 8 and not more than 22 carbon atoms, and a polyvalent fatty acid, (3) polyoxyalkylene aliphatic amines containing a linear or branched alkyl group or alkenyl group having not less than 8 and not more than 20 carbon atoms, and (4) ester compounds of a higher fatty acid having not less than 8 and not more than 22 carbon atoms and a polyhydric alcohol, or compounds produced by adding an alkyleneoxide to the ester compounds.

Examples of commercially available products of the nonionic surfactant include "SURFYNOL"-series products available from Nissin Chemical Industry Co., Ltd., and Air Products & Chemicals, Inc., "ACETYLENOL"-series products available from Kawaken Fine Chemicals Co., Ltd., and "EMULGEN 120" (polyoxyethylene lauryl ether) available from Kao Corporation, etc.

The content of the surfactant in the water-based ink is preferably not less than 0.1% by mass, more preferably not less than 0.2% by mass and even more preferably not less than 0.3% by mass, and is also preferably not more than 5.0% by mass, more preferably not more than 3.0% by mass and even more preferably not more than 2.5% by mass, from the viewpoint of suppressing increase in viscosity of the resulting ink and improving continuous ejection properties of the ink as well as from the viewpoint of obtaining good printed materials that are free of roller transfer contamination and intercolor bleeding.

<Water>

The content of water in the water-based ink is preferably not less than 50% by mass, more preferably not less than 60% by mass and even more preferably not less than 75% by mass, and is also preferably not more than 95% by mass and more preferably not more than 90% by mass, from the viewpoint of improving storage stability and continuous ejection properties of the resulting ink.

It is preferred that the pigment-containing crosslinked polymer particles in the water-based ink are free of swelling or contraction of the particles and flocculation between the particles. It is more preferred that the average particle size of the pigment-containing crosslinked polymer particles in the water-based ink is the same as the average particle size of the particles in the aforementioned pigment water dispersion. The preferred range of the average particle size of the pigment-containing crosslinked polymer particles in the water-based ink is also the same as the preferred range of the average particle size of the particles in the aforementioned pigment water dispersion. The average particle size of the pigment-containing crosslinked polymer particles in the water-based ink may be measured by the method as described in Examples below.

From the viewpoint of improving continuous ejection stability of the resulting ink, the static surface tension of the water-based ink as measured at 20° C. is preferably not less than 23 mN/m and more preferably not less than 25 mN/m, and is also preferably not more than 45 mN/m and more preferably not more than 40 mN/m.

Meanwhile, the static surface tension of the water-based ink as measured at 20° C. may be measured by the method described in Examples below.

The viscosity of the water-based ink as measured at 35° C. is preferably not less than 1.0 mPa·s, more preferably not less than 1.5 mPa·s and even more preferably not less than 2.0 mPa·s, and is also preferably not more than 10 mPa·s, more preferably not more than 7.0 mPa·s and even more preferably not more than 4.0 mPa·s, from the viewpoint of improving continuous ejection stability of the resulting ink.

Meanwhile, the viscosity of the water-based ink as measured at 35° C. may be measured by the method described in Examples below.

[Ink-Jet Printing Method]

In the case where the pigment water dispersion of the present invention is used for a water-based ink for ink-jet printing, as a method of ejecting an ink in the ink-jet printing method, there are known a piezoelectric method utilizing a mechanical energy and a thermal method utilizing a thermal energy. In the thermal ink-jet printing method, the ink may be ejected by the thermal method. In the thermal method, the ink undergoes a rapid change in its volume when applying a thermal energy thereto, and the rapid change in volume of the ink causes such an acting force as to eject the ink from nozzles. For example, the thermal method is preferably conducted according to a basic principle thereof as described in U.S. Pat. Nos. 4,723,129 and 4,740,796. More specifically, as the thermal method, there may be mentioned those methods described in JP 61-59911B, etc.

The water-based ink using the pigment water dispersion of the present invention is capable of achieving stable continuous ejection stability even when using the thermal method as the method for ejecting the ink, and therefore can be suitably used as a water-based ink for thermal ink-jet printing. The reason therefor is considered to be that the water-based ink using the pigment water dispersion of the present invention contains a reduced amount of the unadsorbed polymer and therefore can be prevented from suffering from occurrence of kogation on a thermal head owing to contact of the unadsorbed polymer with the thermal head.

In addition, the water-based ink using the pigment water dispersion of the present invention is excellent in continuous ejection stability, storage stability and solvent resistance and therefore can be suitably used in high-speed printing, for example, in the ink-jet printing methods in which the printing is preferably conducted at a speed of not less than 50 sheets of A4 size paper and more preferably not less than 60 sheets of A4 size paper.

With respect to the aforementioned embodiments, the present invention further provides the following aspects relating to the pigment water dispersion, the process for producing the pigment water dispersion, the water-based ink using the pigment water dispersion, and the ink-jet printing method using the water-based ink.

<1> A pigment water dispersion containing pigment-containing crosslinked polymer particles, in which a crosslinked polymer in the particles is a polymer that is crosslinked with a crosslinking agent represented by the following general formula (1):

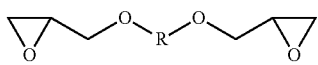

(1)

wherein R is an aliphatic hydrocarbon group having not less than 6 and not more than 14 carbon atoms.

<2> The pigment water dispersion according to the aspect <1>, wherein the crosslinked polymer is a crosslinked product of a water-dispersible polymer that is obtained by crosslinking the water-dispersible polymer with a crosslinking agent represented by the aforementioned formula (1), and the water-dispersible polymer is preferably a vinyl-based polymer that contains a constitutional unit derived from (a) a hydrophobic monomer and a constitutional unit derived from (b) an ionic monomer, and more preferably a vinyl-based polymer that further contains a constitutional unit derived from (c) a nonionic monomer.

<3> The pigment water dispersion according to the aspect <2>, wherein the water-dispersible polymer contains a reactive group capable of reacting with the crosslinking agent represented by the aforementioned formula (1), and the reactive group is preferably a salt-forming group and more preferably a carboxy group.

<4> The pigment water dispersion according to the aspect <2> or <3>, wherein the hydrophobic monomer (a) is preferably at least one monomer selected from the group consisting of an aromatic group-containing monomer, a (meth)acrylate containing a hydrocarbon group derived from an aliphatic alcohol and an aromatic group-containing monomer-based macromer, more preferably at least one monomer selected from the group consisting of an aromatic group-containing monomer and an aromatic group-containing monomer-based macromer, even more preferably at least one monomer selected from the group consisting of an aromatic group-containing (meth)acrylate and a styrene-based macromer, and further even more preferably a combination of an aromatic group-containing (meth)acrylate and a styrene-based macromer.

<5> The pigment water dispersion according to any one of the aspects <2> to <4>, wherein the ionic monomer (b) is preferably an anionic monomer, more preferably a carboxylic acid monomer, even more preferably (meth)acrylic acid, and further even more preferably methacrylic acid.

<6> The pigment water dispersion according to any one of the aspects <2> to <5>, wherein the nonionic monomer (c) is preferably an alkoxy polyalkylene glycol (meth)acrylate and more preferably octoxy polyethylene glycol (n=1 to 30) (meth)acrylate.

<7> The pigment water dispersion according to any one of the aspects <2> to <6>, wherein a content of the hydrophobic monomer (a) is preferably not less than 40% by mass, more preferably not less than 45% by mass and even more preferably not less than 48% by mass, and is also preferably not more than 85% by mass, more preferably not more than 80% by mass and even more preferably not more than 75% by mass.

<8> The pigment water dispersion according to any one of the aspects <2> to <7>, wherein a content of the ionic monomer (b) is preferably not less than 10% by mass, more preferably not less than 13% by mass and even more preferably not less than 15% by mass, and is also preferably not more than 25% by mass, more preferably not more than 23% by mass and even more preferably not more than 21% by mass.

<9> The pigment water dispersion according to any one of the aspects <2> to <8>, wherein in the case of further using the nonionic monomer (c), a content of the nonionic monomer (c) is preferably not less than 0.1% by mass, more preferably not less than 10% by mass and even more preferably not less than 20% by mass, and is also preferably not more than 40% by mass, more preferably not more than 35% by mass and even more preferably not more than 31% by mass.

<10> The pigment water dispersion according to any one of the aspects <2> to <9>, wherein a weight-average molecular weight of the water-dispersible polymer is preferably not less than 3,000, more preferably not less than 5,000, even more preferably not less than 10,000 and further even more preferably not less than 30,000, and is also preferably not more than 200,000, more preferably not more than 100,000, even more preferably not more than 80,000 and further even more preferably not more than 60,000.

<11> The pigment water dispersion according to any one of the aspects <2> to <10>, wherein an acid value of the water-dispersible polymer is preferably not less than 100 mgKOH/g, more preferably not less than 120 mgKOH/g and even more preferably not less than 150 mgKOH/g, and is also preferably not more than 300 mgKOH/g, more preferably not more than 280 mgKOH/g, even more preferably not more than 250 mgKOH/g and further even more preferably not more than 200 mgKOH/g.

<12> The pigment water dispersion according to any one of the aspects <1> to <11>, wherein R as the hydrocarbon group is a linear or branched aliphatic hydrocarbon group or an alicyclic-aliphatic hydrocarbon group.

<13> The pigment water dispersion according to any one of the aspects <1> to <12>, wherein the number of carbon atoms of R as the hydrocarbon group is preferably not more than 10 and even more preferably not more than 8.

<14> The pigment water dispersion according to any one of the aspects <1> to <13>, wherein the crosslinking agent is at least one compound selected from the group consisting of a dihydric alcohol diglycidyl ether containing a linear aliphatic hydrocarbon group, a dihydric alcohol diglycidyl ether containing a branched aliphatic hydrocarbon group, and a dihydric alcohol diglycidyl ether containing an alicyclic-aliphatic hydrocarbon group.

<15> The pigment water dispersion according to any one of the aspects <1> to <13>, wherein the crosslinking agent is preferably at least one compound selected from the group consisting of 1,6-hexanediol diglycidyl ether, 1,8-octanediol diglycidyl ether, 1,10-decanediol diglycidyl ether, 1,12-dodecanediol diglycidyl ether, 1,14-tetradecanediol diglycidyl ether, 1,2-hexanediol diglycidyl ether, 1,2-octanediol diglycidyl ether, 1,4-cyclohexanedimethanol diglycidyl ether, 1,4-cyclohexanediethanol diglycidyl ether and 2-methyl-1,4-cyclohexanedimethanol diglycidyl ether, and more preferably at least one compound selected from the group consisting of 1,6-hexanediol diglycidyl ether and 1,4-cyclohexanedimethanol diglycidyl ether.

<16> The pigment water dispersion according to any one of the aspects <1> to <15>, wherein in the case where the pigment is at least one pigment selected from the group consisting of C.I. Pigment Blue 15:3 and C.I. Pigment Black 7, the crosslinking agent is preferably a dihydric alcohol diglycidyl ether represented by the aforementioned formula (1) in which R is a linear or branched aliphatic hydrocarbon group, and more preferably a dihydric alcohol diglycidyl ether derived from at least one dihydric alcohol selected from the group consisting of α,ω-linear alkanediols and 1,2-alkanediols, which have not less than 6 and not more than 14 carbon atoms.

<17> The pigment water dispersion according to any one of the aspects <1> to <15>, wherein in the case where the pigment is at least one pigment selected from the group consisting of C.I. Pigment Yellow 74 and C.I. Pigment Red 122, the crosslinking agent is preferably a dihydric alcohol diglycidyl ether represented by the aforementioned formula (1) in which R is an alicyclic-aliphatic hydrocarbon group, and more preferably a dihydric alcohol diglycidyl ether derived from a cyclohexane dialkyl alcohol.

<18> The pigment water dispersion according to any one of the aspects <1> to <17>, wherein a rate of dissolution of the crosslinking agent in water is preferably not more than 20% by mass, more preferably not more than 10% by mass and even more preferably not more than 5.0% by mass, and is also not less than 0% by mass.

<19> The pigment water dispersion according to any one of the aspects <1> to <18>, wherein a content of chlorine in the crosslinking agent is preferably not more than 8.0% by mass, more preferably not more than 5.0% by mass, even more preferably not more than 3.0% by mass, further even more preferably not more than 1.0% by mass and still further even more preferably not more than 0.5% by mass, and is also not less than 0% by mass and preferably not less than 0.1% by mass.

<20> The pigment water dispersion according to any one of the aspects <1> to <19>, wherein a content of a chloride ion as an impurity (chlorine content) in the crosslinking agent is preferably not more than 8.0% by mass, more preferably not more than 5.0% by mass, even more preferably not more than 3.0% by mass, further even more preferably not more than 1.0% by mass and still further even more preferably not more than 0.5% by mass, and is also preferably not less than 0% by mass and more preferably not less than 0.1% by mass.

<21> The pigment water dispersion according to any one of the aspects <1> to <20>, wherein a content of the pigment in the pigment water dispersion is preferably not less than 3.0% by mass, more preferably not less than 5.0% by mass and even more preferably not less than 7.0% by mass, and is also preferably not more than 20% by mass, more preferably not more than 17% by mass and even more preferably not more than 15% by mass.

<22> The pigment water dispersion according to any one of the aspects <1> to <21>, wherein a content of the cross-linked polymer in the pigment water dispersion is preferably not less than 0.5% by mass, more preferably not less than 1.0% by mass and even more preferably not less than 3.0% by mass, and is also preferably not more than 15% by mass, more preferably not more than 10% by mass and even more preferably not more than 7.0% by mass.

<23> A process for producing a pigment water dispersion containing pigment-containing crosslinked polymer particles, including the following steps (1) and (2):

Step (1): subjecting a pigment mixture containing a pigment, a water-dispersible polymer and water to dispersion treatment, thereby obtaining an aqueous pigment dispersion solution containing pigment-containing polymer particles; and Step (2): mixing the aqueous pigment dispersion solution obtained in the step (1) and a crosslinking agent represented by the following general formula (1) to react the water-dispersible polymer with the crosslinking agent, thereby obtaining a pigment water dispersion containing pigment-containing crosslinked polymer particles:

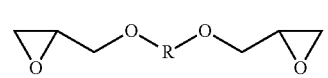

wherein R is an aliphatic hydrocarbon group having not less than 6 and not more than 14 carbon atoms.

<24> The process for producing a pigment water dispersion according to the aspect <23>, wherein a content of the pigment in the pigment mixture is preferably not less than 5.0% by mass, more preferably not less than 8.0% by mass and even more preferably not less than 10% by mass, and is also preferably not more than 30% by mass, more preferably not more than 25% by mass and even more preferably not more than 20% by mass.

<25> The process for producing a pigment water dispersion according to the aspect <23> or <24>, wherein a mass ratio of the pigment to the water-dispersible polymer [pigment/water-dispersible polymer] in the pigment mixture is preferably from 80/20 to 50/50, more preferably from 75/25 to 60/40 and even more preferably from 70/30 to 65/45.

<26> The process for producing a pigment water dispersion according to any one of the aspects <23> to <25>, wherein the step (1) preferably further includes the following steps (1-1) and (1-2):

Step (1-1): dissolving the water-dispersible polymer in an organic solvent and then adding the pigment and water to the resulting solution to obtain a pigment mixture, and thereafter subjecting the resulting pigment mixture to dispersion treatment, thereby obtaining a dispersion treatment product containing pigment-containing polymer particles; and Step (1-2): removing the organic solvent from the dispersion treatment product obtained in the step (1-1), thereby obtaining the aqueous pigment dispersion solution containing pigment-containing polymer particles.

<27> The process for producing a pigment water dispersion according to any one of the aspects <23> to <26>, wherein an amount of the crosslinking agent used is preferably not less than 0.5 part by mass, more preferably not less than 1.0 part by mass, even more preferably not less than 2.0 parts by mass, further even more preferably not less than 3.0 parts by mass and still further even more preferably not less than 4.0 parts by mass, and is also preferably not more than 15 parts by mass, more preferably not more than 13 parts by mass, even more preferably not more than 10 parts by mass and further even more preferably not more than 8.0 parts by mass, on the basis of 100 parts by mass of the water-dispersible polymer.

<28> The process for producing a pigment water dispersion according to any one of the aspects <23> to <27>, wherein a crosslinking rate of the crosslinked polymer is preferably not less than 5.0 equivalent % and more preferably not less than 8.0 equivalent %, and is also preferably not more than 90 equivalent %, more preferably not more than 70 equivalent %, even more preferably not more than 50 equivalent % and further even more preferably not more than 30 equivalent %.

<29> A water-based ink for ink-jet printing, containing the pigment water dispersion according to any one of the aspects <1> to <22>, a solvent and water.

<30> A use of the pigment water dispersion according to any one of the aspects <1> to <22> in a water-based ink for ink-jet printing.

<31> A use of the water-based ink according to the aspect <29> in an ink-jet printing method in which the water-based ink is ejected onto a printing medium by a thermal method to print characters or images on the printing medium.

<32> An ink-jet printing method including the step of ejecting the water-based ink according to the aspect <29> onto a printing medium by a thermal method to print characters or images on the printing medium.

EXAMPLES

In the following Production Example, Examples and Comparative Examples, the "part(s)" and "%" indicate "part(s) by mass" and "% by mass", respectively, unless otherwise specified.

Meanwhile, the weight-average molecular weight of the water-dispersible polymer, the solid contents of the water-dispersible polymer solution, aqueous pigment dispersion solution and pigment water dispersion, the static surface tension and viscosity of the pigment water dispersion and water-based ink, and the average particle size of the pigment-containing crosslinked polymer particles in the ink were measured by the following methods.

(1) Measurement of Weight-Average Molecular Weight of Water-Dispersible Polymer

The weight-average molecular weight of the water-dispersible polymer was measured by gel permeation chromatography [GPC apparatus: "HLC-8120GPC" available from Tosoh Corporation; columns: "TSK-GEL, α-M" ×2 available from Tosoh Corporation; flow rate: 1 mL/min)] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent, and using a polystyrene as a reference standard substance.

(2) Measurement of Solid Contents of Water-Dispersible Polymer Solution, Aqueous Pigment Dispersion Solution and Pigment Water Dispersion Sodium sulfate dried to constant weight in a desiccator was weighed and charged in an amount of 10.0 g into a 30 mL polypropylene reaction vessel (φ: 40 mm; height: 30 mm), and about 1.0 g of a sample to be measured was added to the reaction vessel. The contents of the reaction vessel were mixed and then accurately weighed. The resulting mixture was maintained in the reaction vessel at 105° C. for 2 hours to remove volatile components therefrom, and further allowed to stand in a desiccator for 15 minutes to measure a weight thereof. The weight of the sample after removing the volatile components therefrom was regarded as a weight of solids therein. The solid content of the sample was calculated by dividing the weight of the solids by the weight of the sample initially added.

(3) Static Surface Tensions of Pigment Water Dispersion and Water-Based Ink

A platinum plate was dipped in 5 g of an aqueous ink, i.e., the pigment water dispersion or the water-based ink, filled in a cylindrical polyethylene vessel (3.6 cm in diameter×1.2 cm in depth), and the static surface tension of the pigment water dispersion or the water-based ink was measured at 20° C. using a surface tension meter "CBVP-Z" (tradename) available from Kyowa Interface Science Co., Ltd.

(4) Viscosities of Pigment Water Dispersion and Water-Based Ink

The viscosity of the pigment water dispersion or the water-based ink was measured at 35° C. using an E-type viscometer "Model No.: TV-25" (equipped with a standard cone rotor (1°34'×R24); rotating speed: 50 rpm) available from Toki Sangyo Co., Ltd.

(5) Average Particle Size of Pigment-Containing Crosslinked Polymer Particles in Ink The average particle size of the pigment-containing crosslinked polymer particles was measured using a laser particle analyzing system "ELS-8000" (cumulant analysis) available from Otsuka Electrics Co., Ltd. The measurement was conducted at a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting the concentration of the dispersion to be measured to $5 \times 10^{-3}$%.

Production of Water-Dispersible Polymer

Production Example 1

The monomers, the solvent and the chain transfer agent as shown in "Initially Charged Monomer Solution" in Table 1 were charged into a reaction vessel equipped with two dropping funnels 1 and 2 and mixed with each other, and an inside atmosphere of the reaction vessel was replaced with a nitrogen gas, thereby obtaining an initially charged monomer solution.

On the other hand, the monomers, the solvent, the polymerization initiator and the chain transfer agent as shown in "Dropping Monomer Solution 1" in Table 1 were mixed with each other to obtain a dropping monomer solution 1.

In addition, the monomers, the solvent, the polymerization initiator and the chain transfer agent as shown in "Dropping Monomer Solution 2" in Table 1 were mixed with each other to obtain a dropping monomer solution 2.

The resulting dropping monomer solutions 1 and 2 were charged into the dropping funnels 1 and 2, respectively. In a nitrogen atmosphere, the initially charged monomer solution in the reaction vessel was maintained at 75° C. while stirring, and the dropping monomer solution 1 in the dropping funnel 1 was gradually added dropwise into the reaction vessel over 3 hours. Then, the dropping monomer solution 2 in the dropping funnel 2 was gradually added dropwise into the reaction vessel over 2 hours. After completion of the dropwise addition of the dropping monomer solutions 1 and 2, the resulting mixed solution in the reaction vessel was stirred at 75° C. for 2 hours.

Next, a polymerization initiator solution prepared by dissolving 1.35 parts of a polymerization initiator (2,2'-azobis(2,4-dimethylvaleronitrile)) in 18 parts of methyl ethyl ketone (hereinafter also referred to merely as "MEK") was added to the aforementioned mixed solution, and the resulting reaction solution was aged at 75° C. for 1 hour while stirring. The aforementioned procedure including the preparation and addition of the polymerization initiator solution and the aging of the reaction solution was repeated two more times. Then, the reaction solution in the reaction vessel was maintained at 85° C. for 2 hours, thereby obtaining a water-dispersible polymer solution. The solid content of the thus obtained water-dispersible polymer solution was measured, and the water-dispersible polymer solution was diluted with MEK to adjust the solid content thereof to 38%.

In addition, a part of the resulting water-dispersible polymer was dried to measure a molecular weight of the polymer by the aforementioned method. As a result, it was confirmed that the weight-average molecular weight of the water-dispersible polymer was 50,000.

TABLE 1

|  |  | Reaction vessel Initially charged monomer solution | Dropping funnel 1 Dropping monomer solution 1 | Dropping funnel 2 Dropping monomer solution 2 |
|---|---|---|---|---|
| Monomer composition (active ingredients) (part(s)) | (a) Benzyl acrylate | 36 | 288 | 36 |
|  | (a) Styrene macromer*[1] | 18 | 162 | 0 |
|  | (b) Methacrylic acid | 0 | 144 | 36 |
|  | (c) "NK ESTER EH-4E"*[2] | 27 | 216 | 27 |
| Organic solvent (part(s)) | MEK*[3] | 24.6 | 362.7 | 197.7 |
| Polymerization initiator (part(s)) | "V-65"*[4] | 0 | 7.2 | 1.8 |
| Chain transfer agent (part(s)) | 2-Mercaptoethanol | 0.3 | 1.89 | 0.54 |
| Weight-average molecular weight of water-dispersible polymer obtained |  |  | 50,000 |  |

The details of the respective asterisked signs shown in Table 1 are as follows.
*[1]"AS-6S" (tradename; number-average molecular weight: 6,000; segment: styrene; toluene solution; solid content: 51%) available from Toagosei Co., Ltd.
*[2]Octoxy polyethylene glycol monomethacrylate; "NK ESTER EH-4E" (tradename; average molar number of addition of ethyleneoxide: 4; end group: 2-ethylhexyl group) available from Shin-Nakamura Chemical Co., Ltd.
*[3]Methyl ethyl ketone
*[4]2,2'-Azobis(2,4-dimethylvaleronitrile); "V-65" (tradename) available from Wako Pure Chemical Industries, Ltd.

Production of Pigment Water Dispersions

Example 1-1

(Step (1-1)):

A 2 L-capacity disper "T.K. ROBOMIX" (equipped with "HOMODISPER 2.5 Model" as a stirring device; blade diameter: 40 mm) available from Primix Corporation was charged with 34 parts of the water-dispersible polymer solution (solid content: 38%) obtained in Production Example 1. While stirring the polymer solution in the disper at 1400 rpm, 11 parts of MEK as an organic solvent was added to the polymer solution, and then 100 parts of ion-exchanged water and 5.7 parts of a 5N (16.9%) sodium hydroxide aqueous solution were further added thereto. The resulting reaction solution was stirred at 1400 rpm for 15 minutes while cooling the solution in a water bath at 0° C. After the stirring, 30 parts of C.I. Pigment Yellow 74 "Fast Yellow 840" available from Dainichiseika Color & Chemicals Mfg. Co., Ltd., as the pigment was added to the resulting solution to obtain a pigment mixture, and the resulting pigment mixture was stirred at 8,000 rpm for 1 hour to subject the pigment mixture to preliminary dispersion treatment. The thus obtained dispersion was then subjected to dispersion treatment by passing the dispersion through a Microfluidizer "Model M-140K" (tradename) available from Microfluidics Corporation under a pressure of 150 MPa 15 times, thereby obtaining a dispersion treatment product.

(Step (1-2))

Then, using a vacuum distillation apparatus (rotary evaporator) "N-1000S" (tradename) available from Tokyo Rikakikai Co., Ltd., the dispersion treatment product obtained in the step (1-1) was maintained in a warm bath adjusted to 40° C. under a pressure of 0.02 MPa for 2 hours to remove the organic solvent (MEK) therefrom. The obtained reaction solution was further maintained in the warm bath adjusted to 62° C. for 4 hours under such a condition that the pressure within the apparatus was reduced to 0.01 MPa to remove the organic solvent (MEK) and a part of water therefrom, thereby controlling a total solid content of the pigment and the water-dispersible polymer in the resulting solution to 20%. Next, the resulting reaction mixture was filtered through a 2.5 µm-mesh filter "20L-MPX-025XS" (tradename) available from ROKI Co., Ltd., thereby obtaining an aqueous pigment dispersion solution (solid content: 20%).

(Step (2))

Next, 0.29 part of "DENACOL EX-216L" (1,4-cyclohexanedimethanol diglycidyl ether; epoxy equivalent: 145) as a crosslinking agent available from Nagase ChemteX Corporation and 0.2 part of "Ploxel LVS" (1,2-benzisothiazol-3(2H)-one; active ingredient content: 20%; a mildew-proof agent) available from Arch Chemicals Japan Inc., were added to 80 parts of the aqueous pigment dispersion solution obtained in the step (1-2) (among which the content of the water-dispersible polymer was 4.8 parts), and then ion-exchanged water was further added to the resulting mixture to adjust a solid content thereof to 18%, followed by stirring the resulting dispersion at 70° C. for 1.5 hours to react the water-dispersible polymer with the crosslinking agent, thereby obtaining a pigment water dispersion containing pigment-containing crosslinked polymer particles. At this time, the amount of the crosslinking agent used was 6.0 parts on the basis of 100 parts of the water-dispersible polymer (crosslinking rate: 20 equivalent %).

Example 1-2

The same procedure as in Example 1-1 was repeated except that "DENACOL EX-216L" was replaced with "DENACOL EX-216" (1,4-cyclohexanedimethanol diglycidyl ether; epoxy equivalent: 142) available from Nagase ChemteX Corporation, thereby obtaining a pigment water dispersion containing pigment-containing crosslinked polymer particles.

Example 1-3

The same procedure as in Example 1-1 was repeated except that 0.29 part of "DENACOL EX-216L" was replaced with 0.30 part of "DENACOL EX-212L" (1,6- hexanediol diglycidyl ether; epoxy equivalent: 134) available from Nagase ChemteX Corporation, thereby obtaining a pigment water dispersion containing pigment-containing crosslinked polymer particles. At this time, the amount of the crosslinking agent used was 6.3 parts on the basis of 100 parts of the water-dispersible polymer.

Example 1-4

The same procedure as in Example 1-1 was repeated except that C.I. Pigment Yellow 74 "Fast Yellow 840" was replaced with C.I. Pigment Red 122 "CFR6111T" available from Dainichiseika Color & Chemicals Mfg. Co., Ltd., and the crosslinking rate was changed to 10 equivalent %, thereby obtaining a pigment water dispersion containing pigment-containing crosslinked polymer particles.

Example 1-5

The same procedure as in Example 1-4 was repeated except that 0.29 part of "DENACOL EX-216L" was replaced with 0.30 part of "DENACOL EX-212L" (1,6-hexanediol diglycidyl ether; epoxy equivalent: 134) available from Nagase ChemteX Corporation, thereby obtaining a pigment water dispersion containing pigment-containing crosslinked polymer particles. At this time, the amount of the crosslinking agent used was 6.3 parts on the basis of 100 parts of the water-dispersible polymer.

Example 1-6

The same procedure as in Example 1-1 was repeated except that C.I. Pigment Yellow 74 "Fast Yellow 840" was replaced with C.I. Pigment Blue 15:3 "CFB6338JC" available from Dainichiseika Color & Chemicals Mfg. Co., Ltd., thereby obtaining a pigment water dispersion containing pigment-containing crosslinked polymer particles.

Example 1-7

The same procedure as in Example 1-6 was repeated except that 0.29 part of "DENACOL EX-216L" was replaced with 0.30 part of "DENACOL EX-212L" (1,6-hexanediol diglycidyl ether; epoxy equivalent: 134) available from Nagase ChemteX Corporation, thereby obtaining a pigment water dispersion containing pigment-containing crosslinked polymer particles. At this time, the amount of the crosslinking agent used was 6.3 parts on the basis of 100 parts of the water-dispersible polymer.

Example 1-8

The same procedure as in Example 1-6 was repeated except that 0.29 part of "DENACOL EX-216L" was replaced with 0.34 part of "DENACOL EX-212" (1,6-hexanediol diglycidyl ether; epoxy equivalent: 151) available from Nagase ChemteX Corporation, thereby obtaining a pigment water dispersion containing pigment-containing crosslinked polymer particles. At this time, the amount of the crosslinking agent used was 7.1 parts on the basis of 100 parts of the water-dispersible polymer.

Example 1-9

The same procedure as in Example 1-1 was repeated except that C.I. Pigment Yellow 74 "Fast Yellow 840" was replaced with C.I. Pigment Black 7 "MONARCH 17" available from Cabot Corporation, thereby obtaining a pigment water dispersion containing pigment-containing crosslinked polymer particles.

Example 1-10

The same procedure as in Example 1-9 was repeated except that 0.29 part of "DENACOL EX-216L" was replaced with 0.30 part of "DENACOL EX-212L" (1,6-hexanediol diglycidyl ether; epoxy equivalent: 134) available from Nagase ChemteX Corporation, thereby obtaining a pigment water dispersion containing pigment-containing crosslinked polymer particles. At this time, the amount of the crosslinking agent used was 6.3 parts on the basis of 100 parts of the water-dispersible polymer.

Comparative Example 1-1

The same procedure as in Example 1-1 was repeated except that 0.29 part of "DENACOL EX-216L" was replaced with 0.30 part of "DENACOL EX-321L" (trimethylolpropane polyglycidyl ether; epoxy equivalent: 130) available from Nagase ChemteX Corporation, thereby obtaining a pigment water dispersion containing pigment-containing crosslinked polymer particles.

Comparative Example 1-2

The same procedure as in Example 1-1 was repeated except that 0.29 part of "DENACOL EX-216L" was replaced with 0.30 part of "DENACOL EX-211L" (neopentyl glycol diglycidyl ether; epoxy equivalent: 130) available from Nagase ChemteX Corporation, thereby obtaining a pigment water dispersion containing pigment-containing crosslinked polymer particles.

Comparative Example 1-3

The same procedure as in Example 1-1 was repeated except that 0.29 part of "DENACOL EX-216L" was replaced with 0.40 part of "DENACOL EX-920" (polypropylene glycol diglycidyl ether; epoxy equivalent: 176) available from Nagase ChemteX Corporation, thereby obtaining a pigment water dispersion containing pigment-containing crosslinked polymer particles.

Comparative Example 1-4

The same procedure as in Example 1-1 was repeated except that 0.29 part of "DENACOL EX-216L" was replaced with 0.48 part of "DENACOL EX-252" (hydrogenated bisphenol A diglycidyl ether; epoxy equivalent: 213) available from Nagase ChemteX Corporation, thereby obtaining a pigment water dispersion containing pigment-containing crosslinked polymer particles.

Comparative Example 1-5

The same procedure as in Example 1-1 was repeated except that 0.29 part of "DENACOL EX-216L" was replaced with 0.38 part of "DENACOL EX-911" (propylene glycol diglycidyl ether; epoxy equivalent: 165) available from Nagase ChemteX Corporation, thereby obtaining a pigment water dispersion containing pigment-containing crosslinked polymer particles.

Comparative Example 1-6

The same procedure as in Example 1-1 was repeated except that no step (2) was conducted, thereby obtaining a pigment water dispersion containing pigment-containing polymer particles.

Comparative Example 1-7

The same procedure as in Example 1-4 was repeated except that 0.29 part of "DENACOL EX-216L" was replaced with 0.30 part of "DENACOL EX-321L" (trimethylolpropane polyglycidyl ether; epoxy equivalent: 130) available from Nagase ChemteX Corporation, thereby obtaining a pigment water dispersion containing pigment-containing crosslinked polymer particles.

Comparative Example 1-8

The same procedure as in Example 1-6 was repeated except that 0.29 part of "DENACOL EX-216L" was replaced with 0.30 part of "DENACOL EX-321L" (trimethylolpropane polyglycidyl ether; epoxy equivalent: 130) available from Nagase ChemteX Corporation, thereby obtaining a pigment water dispersion containing pigment-containing crosslinked polymer particles.

Comparative Example 1-9

The same procedure as in Example 1-9 was repeated except that 0.29 part of "DENACOL EX-216L" was replaced with 0.30 part of "DENACOL EX-321L" (trimethylolpropane polyglycidyl ether; epoxy equivalent: 130) available from Nagase ChemteX Corporation, thereby obtaining a pigment water dispersion containing pigment-containing crosslinked polymer particles.

The pigment water dispersions obtained in Examples 1-1 to 1-10 and Comparative Examples 1-1 to 1-9 all had a static surface tension of 43 mN/m.

The pigment water dispersions obtained in Examples 1-1 to 1-3 and Comparative Examples 1-1 to 1-6 had a viscosity of 2.8 mPa·s; the pigment water dispersions obtained in Examples 1-4 and 1-5 and Comparative Example 1-7 had a viscosity of 2.6 mPa·s; the pigment water dispersions obtained in Examples 1-6 to 1-8 and Comparative Example 1-8 had a viscosity of 2.2 mPa·s; and the pigment water dispersions obtained in Examples 1-9 and 1-10 and Comparative Example 1-9 had a viscosity of 2.4 mPa·s.

Production of Water-Based Inks

Examples 2-1 to 2-3 and Comparative Examples 2-1 to 2-6

(Water-Based Inks Containing C.I. Pigment Yellow 74)

The pigment water dispersions obtained in Examples 1-1 to 1-3 and Comparative Examples 1-1 to 1-6 were respectively compounded with a solvent and a surfactant and further with water as the balance, and the resulting mixed solution was filtered through a 0.3 µm-mesh filter "20L-MBP-003XS" (tradename) available from ROKI Co., Ltd., thereby obtaining water-based inks.

The contents of the respective components in the thus obtained water-based inks were as follows. That is, the total content of the pigment and the crosslinked polymer in the respective inks was 5.7%; the content of polyethylene glycol 400 (hereinafter also referred to merely as "PEG400") therein was 10%; the content of "SURFYNOL 104 PG-50" (a propylene glycol solution of an acetylene glycol-based surfactant; active ingredient content: 50%) available from Air Products & Chemicals, Inc., therein was 0.5%; and the content of polyoxyethylene lauryl ether "EMULGEN 120" available from Kao Corporation therein was 0.5%.

The water-based inks obtained in Examples 2-1 to 2-3 and Comparative Examples 2-1 to 2-6 had a static surface tension of 28 mN/m and a viscosity of 2.3 mPa·s.

Examples 2-4 and 2-5 and Comparative Example 2-7

(Water-Based Inks Containing C.I. Pigment Red 122)

The pigment water dispersions obtained in Examples 1-4 and 1-5 and Comparative Example 1-7 were respectively compounded with a solvent and a surfactant and further with water as the balance, and the resulting mixed solution was filtered through a 0.3 µm-mesh filter "20L-MBP-003XS" (tradename) available from ROKI Co., Ltd., thereby obtaining water-based inks.

The contents of the respective components in the thus obtained water-based inks were as follows. That is, the total content of the pigment and the crosslinked polymer in the respective inks was 7.1%; the content of PEG400 therein was 10%; the content of "SURFYNOL 104 PG-50" available from Air Products & Chemicals, Inc., therein was 0.5%; and the content of "EMULGEN 120" available from Kao Corporation therein was 0.5%.

The water-based inks obtained in Examples 2-4 and 2-5 and Comparative Example 2-7 had a static surface tension of 28 mN/m and a viscosity of 2.3 mPa·s.

Examples 2-6 to 2-8 and Comparative Example 2-8

(Water-Based Inks Containing C.I. Pigment Blue 15:3)

The pigment water dispersions obtained in Examples 1-6 to 1-8 and Comparative Example 1-8 were respectively mixed with a solvent and a surfactant and further with water as the balance, and the resulting mixed solution was filtered through a 0.3 µm-mesh filter "20L-MBP-003XS" (tradename) available from ROKI Co., Ltd., thereby obtaining water-based inks.

The contents of the respective components in the thus obtained water-based inks were as follows. That is, the total content of the pigment and the crosslinked polymer in the respective inks was 5.0%; the content of PEG400 therein was 18%; the content of "SURFYNOL 104 PG-50" available from Air Products & Chemicals, Inc., therein was 0.5%; and the content of "EMULGEN 120" available from Kao Corporation therein was 0.5%.

The water-based inks obtained in Examples 2-6 to 2-8 and Comparative Example 2-8 had a static surface tension of 28 mN/m and a viscosity of 2.3 mPa·s.

Examples 2-9 and 2-10 and Comparative Example 2-9

(Water-Based Inks Containing C.I. Pigment Black 7)

The pigment water dispersions obtained in Examples 1-9 and 1-10 and Comparative Example 1-9 were respectively mixed with a solvent and a surfactant and further with water as the balance, and the resulting mixed solution was filtered through a 0.3 µm-mesh filter "20L-MBP-003XS" (tradename) available from ROKI Co., Ltd., thereby obtaining water-based inks.

The contents of the respective components in the thus obtained water-based inks were as follows. That is, the total content of the pigment and the crosslinked polymer in the respective inks was 7.1%; the content of PEG400 therein was 12%; the content of "SURFYNOL 104 PG-50" available from Air Products & Chemicals, Inc., therein was 0.5%; and the content of "EMULGEN 120" available from Kao Corporation therein was 0.5%.

The water-based inks obtained in Examples 2-9 and 2-10 and Comparative Example 2-9 had a static surface tension of 28 mN/m and a viscosity of 2.3 mPa·s.

<Evaluation of Continuous Ejection Stability>

Using an ink-jet printer "LPP-6010N" equipped with a thermal print head, available from LG Electronics Inc., which was modified by drawing a feed tube out of the printer and introducing the tube into an ink tank to allow the printer to be ready for printing, 100%-Duty printing was conducted in Best Mode at a resolution of 1600 dpi in vertical direction×1600 dpi in lateral direction under environmental conditions of a temperature of 25±1° C. and a relative humidity of 30±5%. The continuous ejection stability of the water-based ink was determined by conducting the aforementioned printing on sheets of A4 size plain paper to count and measure the number of sheets of A4 size plain paper printed until an optical density value of printed ink on a predetermined sheet of A4 size plain paper was lower than that on the 1st sheet of A4 size plain paper, and evaluated according to the following evaluation ratings. As the plain paper, there was used "All-in One paper" available from Office Maxs. If the evaluation rating was A, B or C, it was possible to use the ink in practical applications. The results are shown in Table 2.

Meanwhile, the optical density was determined as follows. That is, the optical density (value outputted as optical density of black images) of the printed material prepared above on the plain paper was measured at five points in total using a Macbeth densitometer "SpectroEye" (part number) available from GretagMacbeth GmbH under the following measuring conditions: observation viewing angle: 2°; observation light source: $D_{65}$; reference white level: Abs; polarizing filter: none; density standard: DIN, and an average value of the thus measured five values was calculated and used as the optical density of the printed material.

(Evaluation Ratings)
A: Not less than 15,000 sheets of A4 size paper;
B: Not less than 10,000 sheets and less than 15,000 sheets of A4 size paper;
C: Not less than 5,000 sheets and less than 10,000 sheets of A4 size paper;
D: Not less than 1,000 sheets and less than 5,000 sheets of A4 size paper;
E: Less than 1,000 sheets of A4 size paper.

<Evaluation of Storage Stability>

A 50 cc screw vial was filled with 40 g of the ink and hermetically closed by a cap. The thus filled screw vial was placed and stored in a thermo-hygrostat "Model No.: PR-3FT" available from Espec Corporation which was set to a temperature of 70° C. for 2 weeks to evaluate the change in average particle size of the particles in the ink between before and after the storage test by the rate of change in particle size (1) calculated according to the following formula. As the following rate of change in particle size (1) is closer to 100%, the storage stability of the ink becomes more excellent. The results are shown in Table 2.

Rate of Change in Particle Size (1) (%)=(Average Particle Size of Pigment-Containing Crosslinked Polymer Particles in Ink after Storage Test/Initial Average Particle Size of Pigment-Containing Crosslinked Polymer Particles)×100

Meanwhile, the initial average particle size means an average particle size of the pigment-containing crosslinked polymer particles in the ink before the storage test, and also shown in Table 2.

<Evaluation of Solvent Resistance>

A 50 cc screw vial was filled with 40 g of dipropylene glycol methyl ether, and 0.2 g of the ink was added thereto. The resulting ink mixture was stirred using a ball mill at 100 rpm for 1 hour.

The change in average particle size of the particles in the ink between before and after the stirring was evaluated by the rate of change in particle size (2) calculated according to the following formula. As the following rate of change in particle size (2) is closer to 100%, the solvent has a less adverse influence on the pigment-containing crosslinked polymer particles, and the solvent resistance of the ink becomes more excellent. Further, if the rate of change in particle size (2) is not more than 200%, the ink could be used in practical applications. The rate of change in particle size (2) is preferably not more than 180%, more preferably not more than 170% and even more preferably not more than 165%. The results are shown in Table 2.

Rate of Change in Particle Size (2) (%)=(Average Particle Size of Pigment-Containing Crosslinked Polymer Particles in Dipropylene Glycol Methyl Ether-Containing Medium/Initial Average Particle Size of Pigment-Containing Crosslinked Polymer Particles)×100

Meanwhile, the initial average particle size means an average particle size of the pigment-containing crosslinked polymer particles in the ink before adding dipropylene glycol methyl ether thereto, and also is the same as the initial average particle size of the pigment-containing crosslinked polymer particles as used in the aforementioned formula for calculating the rate of change in particle size (1).

Meanwhile, the details of the pigments and the crosslinking agents shown in Table 2 are as follows.

(Pigment)
PY74: C.I. Pigment Yellow 74 "Fast Yellow 840" available from Dainichiseika Color & Chemicals Mfg. Co., Ltd.
PR122: C.I. Pigment Red 122 "CFR6111T" available from Dainichiseika Color & Chemicals Mfg. Co., Ltd.
PB15:3: C.I. Pigment Blue 15:3 "CFB6338JC" available from Dainichiseika Color & Chemicals Mfg. Co., Ltd.
PB7: C.I. Pigment Black 7 "MONARCH 717" available from Evonik Degussa Japan Co., Ltd.

(Crosslinking Agent)
EX-216L: "DENACOL EX-216L" (1,4-cyclohexanedimethanol diglycidyl ether; epoxy equivalent: 145) available from Nagase ChemteX Corporation
EX-216: "DENACOL EX-216" (1,4-cyclohexanedimethanol diglycidyl ether; epoxy equivalent: 142) available from Nagase ChemteX Corporation
EX-212L: "DENACOL EX-212L" (1,6-hexanediol diglycidyl ether; epoxy equivalent: 134) available from Nagase ChemteX Corporation
EX-212: "DENACOL EX-212" (1,6-hexanediol diglycidyl ether; epoxy equivalent: 151) available from Nagase ChemteX Corporation
EX-321L: "DENACOL EX-321L" (trimethylolpropane polyglycidyl ether; epoxy equivalent: 130) available from Nagase ChemteX Corporation
EX-211L: "DENACOL EX-211L" (neopentyl glycol diglycidyl ether; epoxy equivalent: 130) available from Nagase ChemteX Corporation EX-920: "DENACOL EX-920" (polypropylene glycol diglycidyl ether; epoxy equivalent: 176) available from Nagase ChemteX Corporation EX-252: "DENACOL EX-252" (hydrogenated bisphenol A diglycidyl ether; epoxy equivalent: 213) available from Nagase ChemteX Corporation EX-911: "DENACOL EX-911" (propylene glycol diglycidyl ether; epoxy equivalent: 165) available from Nagase ChemteX Corporation produced from the respective pigment water dispersions obtained in Comparative Examples 1-1 to 1-9. It was also confirmed that the water-based inks produced from the respective pigment water dispersions obtained in Comparative Examples 1-1, 1-7, 1-8 and 1-9 were improved in solvent resistance, but failed to attain good continuous ejection stability, and therefore were deteriorated in balance between continuous ejection stability, storage stability and solvent resistance.

TABLE 2

| | | | Pigment water dispersion | | | | |
|---|---|---|---|---|---|---|---|
| | | | Crosslinking agent | | | | |
| No. | | Kind | Alcohol introduced into R in formula (1) | Number of carbon atoms of R in formula (1) | Dissolution rate*[1] (%) | Chlorine content*[2] (%) | Pigment Kind |
| Examples | 1-1 | EX-216L | 1,4-Cyclohexanedimethanol | 8 | 0 | 0.4 | PY74 |
| | 1-2 | EX-216 | 1,4-Cyclohexanedimethanol | 8 | 0 | 5.8 | PY74 |
| | 1-3 | EX-212L | 1,6-Hexanediol | 6 | 0 | 0.4 | PY74 |
| | 1-4 | EX-216L | 1,4-Cyclohexanedimethanol | 8 | 0 | 0.4 | PR122 |
| | 1-5 | EX-212L | 1,6-Hexanediol | 6 | 0 | 0.4 | PR122 |
| | 1-6 | EX-216L | 1,4-Cyclohexanedimethanol | 8 | 0 | 0.4 | PB15:3 |
| | 1-7 | EX-212L | 1,6-Hexane diol | 6 | 0 | 0.4 | PB15:3 |
| | 1-8 | EX-212 | 1,6-Hexanediol | 6 | 0 | 6.3 | PB15:3 |
| | 1-9 | EX-216L | 1,4-Cyclohexanedimethanol | 8 | 0 | 0.4 | PB7 |
| | 1-10 | EX-212L | 1,6-Hexanediol | 6 | 0 | 0.4 | PB7 |
| Comparative Examples | 1-1 | EX-321L | Trimethylolpropane | — | 27 | 0.3 | PY74 |
| | 1-2 | EX-211L | Neopentyl glycol | 5 | 0 | 0.7 | PY74 |
| | 1-3 | EX-920 | Polypropylene glycol | — | 100 | 0.8 | PY74 |
| | 1-4 | EX-252 | Hydrogenated bisphenol A | 15 | 0 | 4.5 | PY74 |
| | 1-5 | EX-911 | Propylene glycol | 3 | 75 | 10 | PY74 |
| | 1-6 | No crosslinking agent used | — | — | — | — | PY74 |
| | 1-7 | EX-321L | Trimethylolpropane | — | 27 | 0.3 | PR122 |
| | 1-8 | EX-321L | Trimethylolpropane | — | 27 | 0.3 | PB15:3 |
| | 1-9 | EX-321L | Trimethylolpropane | — | 27 | 0.3 | PB7 |

| | | | Water-based ink | | | |
|---|---|---|---|---|---|---|
| | | | | Evaluation | | |
| No. | | Concentration of pigment (%) | Continuous ejection stability | Initial average particle size*[3] (nm) | Storage stability (%) | Solvent resistance (%) |
| Examples | 2-1 | 4.0 | A | 128 | 101 | 169 |
| | 2-2 | 4.0 | C | 132 | 102 | 162 |
| | 2-3 | 4.0 | B | 131 | 105 | 161 |
| | 2-4 | 5.0 | A | 118 | 102 | 155 |
| | 2-5 | 5.0 | B | 115 | 107 | 165 |
| | 2-6 | 3.5 | B | 89 | 106 | 164 |
| | 2-7 | 3.5 | A | 91 | 101 | 165 |
| | 2-8 | 3.5 | C | 92 | 101 | 166 |
| | 2-9 | 5.0 | B | 114 | 106 | 168 |
| | 2-10 | 5.0 | A | 111 | 101 | 154 |
| Comparative Examples | 2-1 | 4.0 | D | 135 | 115 | 126 |
| | 2-2 | 4.0 | D | 129 | 107 | 210 |
| | 2-3 | 4.0 | E | 128 | 109 | 319 |
| | 2-4 | 4.0 | E | 131 | 132 | 260 |
| | 2-5 | 4.0 | E | 127 | 112 | 509 |
| | 2-6 | 4.0 | E | 133 | 184 | 738 |
| | 2-7 | 5.0 | D | 124 | 120 | 135 |
| | 2-8 | 3.5 | D | 97 | 120 | 154 |
| | 2-9 | 5.0 | E | 123 | 125 | 135 |

Meanwhile, the details of the respective asterisked signs shown in Table 2 are as follows.
*[1]Rate (%) of dissolution of the crosslinking agent as measured by dissolving 10 parts of the crosslinking agent in 90 parts of pure water at 25° C.
*[2]Content (%) of chlorine in the crosslinking agent.
*[3]Initial average particle size of particles in the water-based ink.

From Table 2, it was confirmed that the water-based inks produced from the respective pigment water dispersions obtained in Examples 1-1 to 1-10 were excellent in balance between continuous ejection stability, storage stability and solvent resistance as compared to the water-based inks

INDUSTRIAL APPLICABILITY

The pigment water dispersion of the present invention is excellent in continuous ejection stability, storage stability and solvent resistance of an ink when compounded in the ink, and therefore can be suitably used as a pigment water dispersion for flexographic printing, gravure printing or ink-jet printing.

The invention claimed is:

1. A pigment water dispersion comprising pigment-containing crosslinked polymer particles, in which a crosslinked polymer in the particles is a crosslinked product of a water-dispersible polymer that is obtained by crosslinking the water-dispersible polymer with a crosslinking agent represented by the following general formula (1):

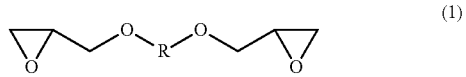

(1)

wherein R is an aliphatic hydrocarbon group having not less than 6 and not more than 14 carbon atoms, and wherein a content of chlorine in the crosslinking agent is not more than 5.0%, and
the water-dispersible polymer is a vinyl-based polymer comprising
a constitutional unit derived from (a) a hydrophobic monomer which is at least one monomer selected from the group consisting of an aromatic group-containing (meth)acrylate and a styrene-based macromer,
a constitutional unit derived from (b) an ionic monomer, and
a constitutional unit derived from (c) a nonionic monomer which is at least one monomer selected from the group consisting of polyalkylene glycol (meth)acrylates, alkoxy polyalkylene glycol (meth)acrylates, and aralkoxy polyalkylene glycol (meth)acrylates.

2. The pigment water dispersion according to claim 1, wherein the water-dispersible polymer is a carboxy group-containing polymer.

3. The pigment water dispersion according to claim 1, wherein the crosslinking agent is at least one compound selected from the group consisting of a dihydric alcohol diglycidyl ether comprising a linear aliphatic hydrocarbon group, a dihydric alcohol diglycidyl ether comprising a branched aliphatic hydrocarbon group and a dihydric alcohol diglycidyl ether comprising an alicyclic-aliphatic hydrocarbon group.

4. pigment water dispersion according to claim 1, wherein the crosslinking agent is at least one compound selected from the group consisting of 1,6-hexanediol diglycidyl ether, 1,8-octanediol diglycidyl ether, 1,10-decanediol diglycidyl ether, 1,12-dodecanediol diglycidyl ether, 1,14-tetradecanediol diglycidyl ether, 1,2-hexanediol diglycidyl ether, 1,2-octanediol diglycidyl ether, 1,4-cyclohexanedimethanol diglycidyl ether, 1,4-cyclohexanediethanol diglycidyl ether and 2-methyl-1,4-cyclohexanedimethanol diglycidyl ether.

5. The pigment water dispersion according to claim 1, wherein the pigment is at least one pigment selected from the group consisting of C.I. Pigment Blue 15:3 and C.I. Pigment Black 7, and the crosslinking agent is a dihydric alcohol diglycidyl ether represented by the formula (1) wherein R is a linear or branched aliphatic hydrocarbon group.

6. The pigment water dispersion according to claim 1, wherein the pigment is at least one pigment selected from the group consisting of C.I. Pigment Yellow 74 and C.I. Pigment Red 122, and the crosslinking agent is a dihydric alcohol diglycidyl ether represented by the formula (1) wherein R is an alicyclic-aliphatic hydrocarbon group.

7. The pigment water dispersion according to claim 1, wherein a content of a chloride ion as an impurity in the crosslinking agent as the compound represented by the formula (1) is not more than 3.0% by mass and not less than 0% by mass.

8. The pigment water dispersion according to claim 1, wherein a content of the crosslinked polymer in the pigment water dispersion is not less than 0.5% by mass and not more than 15% by mass.

9. The pigment water dispersion according to claim 1, wherein the ionic monomer (b) is a carboxylic acid monomer.

10. The pigment water dispersion according to claim 1, wherein the nonionic monomer (c) is an alkoxy polyalkylene glycol (meth)acrylate.

11. The pigment water dispersion according to claim 1, wherein a rate of dissolution of the crosslinking agent in water is not more than 20% by mass.

12. The pigment water dispersion according to claim 1, wherein a content of the constitutional units derived from the hydrophobic monomer (a) in the water-dispersible polymer is not less than 40% by mass and not more than 75% by mass.

13. The pigment water dispersion according to claim 1, wherein a content of the constitutional units derived from the ionic monomer (b) in the water-dispersible polymer is not less than 15% by mass and not more than 25% by mass.

14. The pigment water dispersion according to claim 1, wherein a content of the constitutional units derived from the ionic monomer (c) in the water-dispersible polymer is not less than 10% by mass and not more than 40% by mass.

15. A water-based ink for ink-jet printing, comprising the pigment water dispersion according to claim 1, a solvent and water.

16. An ink-jet printing method comprising the step of ejecting the water-based ink according to claim 15 onto a printing medium by a thermal method to print characters or images on the printing medium.

* * * * *